(12) United States Patent
Mackey

(10) Patent No.: US 7,382,139 B2
(45) Date of Patent: Jun. 3, 2008

(54) ONE LAYER CAPACITIVE SENSING APPARATUS HAVING VARYING WIDTH SENSING ELEMENTS

(75) Inventor: Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 10/861,210

(22) Filed: Jun. 3, 2004

(65) Prior Publication Data

US 2005/0270039 A1    Dec. 8, 2005

(51) Int. Cl.
G01R 27/26 (2006.01)
G06F 3/041 (2006.01)

(52) U.S. Cl. .................................... 324/660; 345/173
(58) Field of Classification Search ........ 324/658–662; 345/173
See application file for complete search history.

(56) References Cited

U.S. PATENT DOCUMENTS

| | | | |
|---|---|---|---|
| 4,087,625 A | | 5/1978 | Dym et al. |
| 4,264,903 A | | 4/1981 | Bigelow |
| 4,743,838 A | * | 5/1988 | Eckerle ...................... 324/660 |
| 5,053,715 A | * | 10/1991 | Andermo ..................... 324/662 |
| 5,374,787 A | | 12/1994 | Miller et al. |
| 5,495,077 A | | 2/1996 | Miller et al. |
| 5,534,886 A | * | 7/1996 | Nomura et al. ............. 345/104 |
| 5,543,590 A | | 8/1996 | Gillespie et al. |
| 5,543,591 A | | 8/1996 | Gillespie et al. |
| 5,648,642 A | | 7/1997 | Miller et al. |
| 5,650,597 A | | 7/1997 | Redmayne |
| 5,841,078 A | | 11/1998 | Miller et al. |
| 5,880,411 A | | 3/1999 | Gillespie et al. |
| 5,914,465 A | | 6/1999 | Allen et al. |
| 5,920,310 A | | 7/1999 | Faggin et al. |
| 6,028,271 A | | 2/2000 | Gillespie et al. |
| 6,133,743 A | * | 10/2000 | Gleixner et al. ............. 324/683 |
| 6,188,391 B1 | | 2/2001 | Seely et al. |
| 6,239,389 B1 | | 5/2001 | Allen et al. |
| 6,288,707 B1 | * | 9/2001 | Philipp ....................... 345/168 |
| 6,297,811 B1 | | 10/2001 | Kent et al. |
| 6,346,818 B2 | * | 2/2002 | Wilson et al. .............. 324/658 |

(Continued)

FOREIGN PATENT DOCUMENTS

WO    WO 03/088176 A1    10/2003

OTHER PUBLICATIONS

Triangle Wave, printed Aug. 28, 2007.*

(Continued)

*Primary Examiner*—Andrew H. Hirshfeld
*Assistant Examiner*—Jeff Natalini

(57) ABSTRACT

One embodiment in accordance with the invention includes a two-dimensional capacitive sensor apparatus. The two-dimensional capacitive sensor can include a first sensing element having varying width, a second sensing element having varying width, and a third sensing element having varying width. Additionally, the first sensing element, second sensing element, and third sensing element are substantially parallel to a first axis. Furthermore, each of the first sensing element, second sensing element, and third sensing element can be located such that they are not required to overlap each other to determine a first location along the first axis of a two-dimensional space. Moreover, the first sensing element, second sensing element, and third sensing element can have a cumulative width that is substantially constant.

61 Claims, 16 Drawing Sheets

U.S. PATENT DOCUMENTS

| | | |
|---|---|---|
| 6,380,931 B1 | 4/2002 | Gillespie et al. |
| 6,414,671 B1 | 7/2002 | Gillespie et al. |
| 6,489,899 B1 | 12/2002 | Ely et al. |
| 6,610,936 B2 | 8/2003 | Gillespie et al. |
| 6,667,740 B2 | 12/2003 | Ely et al. |
| 6,879,930 B2 * | 4/2005 | Sinclair et al. ............. 702/150 |
| 2003/0028346 A1 | 2/2003 | Sinclair |

OTHER PUBLICATIONS

Baxter, Larry K. (1997) *Captive Sensors: Design and Applications*; IEEE Press Series ISBN 0-7803-5351-x.

* cited by examiner

ONE LAYER CAPACITIVE SENSING APPARATUS HAVING VARYING WIDTH SENSING ELEMENTS

BACKGROUND

Conventional computing devices provide several ways for enabling a user to input a choice or a selection. For example, a user can use one or more keys of an alphanumeric keyboard communicatively connected to the computing device in order to indicate a choice or selection. Additionally, a user can use a cursor control device communicatively connected to the computing device to indicate a choice. Also, a user can use a microphone communicatively connected to the computing device to audibly indicate a particular selection. Moreover, touch sensing technology can be used to provide an input selection to a computing device or other electronic device.

Within the broad category of touch sensing technology there exist capacitive sensing touch screens. Among conventional capacitive sensing touch screens, there are different sensing technologies. For example, one sensing technology involves the use of sensing electrodes formed in triangular shapes wherein the direction of each triangle point alternates. However, there are disadvantages associated with this technique. For instance, one of the disadvantages is that as a finger (or object) moves towards the wide end of a first triangular shaped electrode and the narrow point of a second triangular shaped electrode, the narrow point electrode does not provide a quality signal because of its inherent signal to noise ratio. As such, this can be referred to as sensing geometry that induces signal to noise ratio concerns.

Another sensing technology uses a grid of conductive elements that cross over one another. While this design offers ease of signal interpretation, it also has the disadvantage of higher manufacturing cost. A further disadvantage affects multiple-layer sensors, as each layer degrades optical clarity of a capacitive sensing touch screen.

The present invention may address one or more of the above mentioned issues.

SUMMARY

One embodiment in accordance with the invention includes a two-dimensional capacitive sensor apparatus. The two-dimensional capacitive sensor can include a first sensing element having varying width, a second sensing element having varying width, and a third sensing element having varying width. Additionally, the first sensing element, second sensing element, and third sensing element are substantially parallel to a first axis. Furthermore, each of the first sensing element, second sensing element, and third sensing element can be located such that they are not required to overlap each other to determine a first location along the first axis of a two-dimensional space. Moreover, the first sensing element, second sensing element, and third sensing element can have a cumulative width that is substantially constant.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
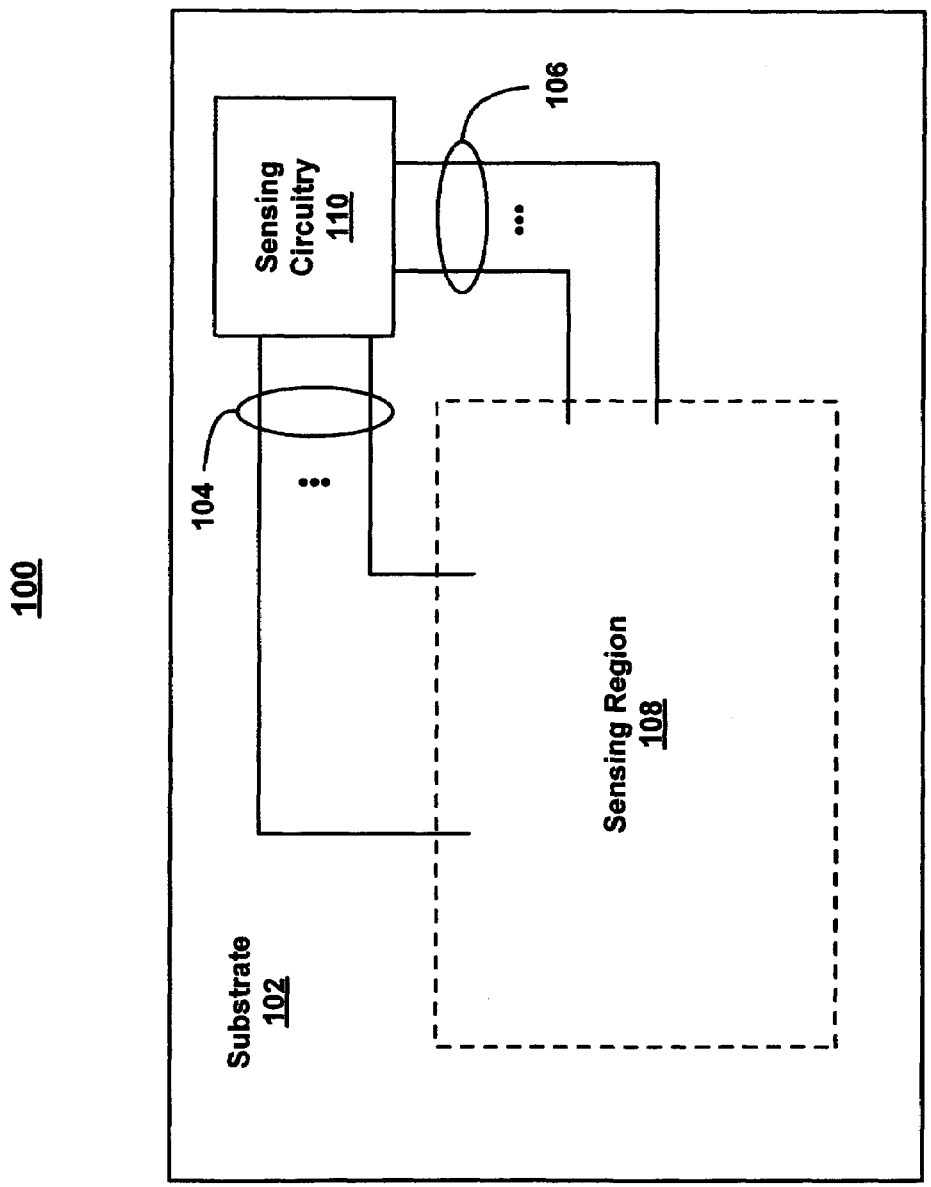
FIG. 1 is an exemplary capacitive touch screen device that can be implemented to include one or more embodiments of the invention.

FIG. 1 is a plan view of an exemplary two-dimensional capacitive sensor apparatus 100 that can be implemented to include one or more embodiments of the present invention. The capacitive sensor apparatus 100 can be utilized to communicate user input (e.g., using a user's finger or a probe) to a computing device or other electronic device. For example, capacitive sensor apparatus 100 can be implemented as a capacitive touch screen device that can be placed over an underlying image or an information display device (not shown). In this manner, a user would view the underlying image or information display by looking through the substantially transparent sensing region 108 of capacitive sensor apparatus 100 as shown. It is noted that one or more embodiments in accordance with the present invention can be incorporated with a capacitive touch screen device similar to capacitive sensor apparatus 100.

The capacitive sensor apparatus 100 when implemented as a touch screen can include a substantially transparent substrate 102 having a first set of conductive coupling traces 104 and a second set of conductive coupling traces 106 patterned (or formed) thereon. Conductive coupling traces 104 and/or 106 can be utilized for coupling any sensing elements (not shown) or conductive traces that would form a sensing region 108 with sensing circuitry 110 thereby enabling the operation of capacitive sensor apparatus 100. Conductive coupling traces 104 and 106 may each include one or more conductive coupling elements or traces. It is noted that embodiments of sensing element patterns in accordance with the invention are described herein which can be implemented to form sensing region 108.

Within FIG. 1, the capacitive sensor apparatus 100 can also be implemented as a capacitive touchpad device. For example, substrate 102 of capacitive sensor apparatus 100 can be implemented with, but is not limited to, one or more opaque materials that are utilized as a substrate for a capacitive touchpad device.

Figure 2:
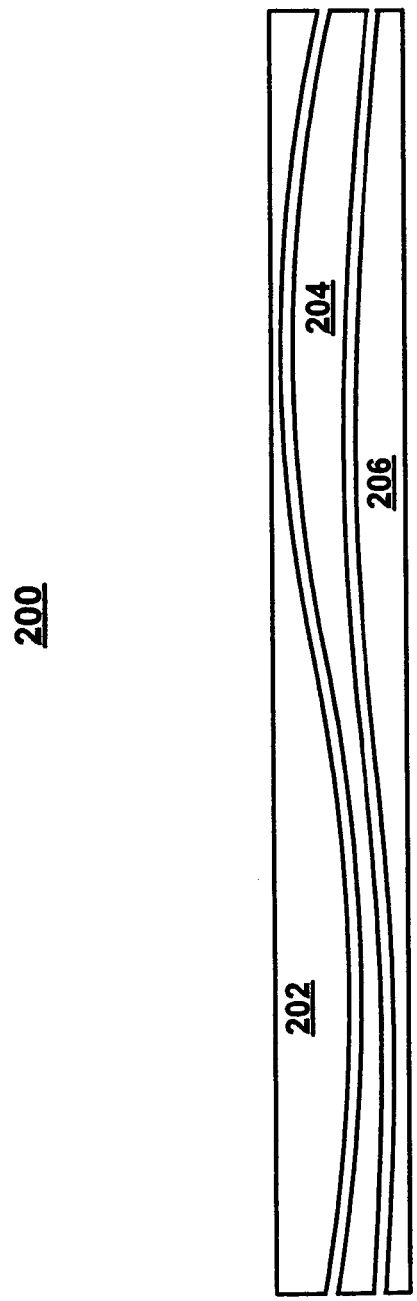
FIG. 2 illustrates an exemplary capacitive sensor pattern in accordance with embodiments of the invention.

FIG. 2 is a plan view of an exemplary capacitive sensor pattern 200 in accordance with embodiments of the invention. Specifically, sensor pattern 200 includes sensing elements 202, 204, and 206 having three phases which can be utilized as part of a two-dimensional capacitive sensor apparatus (e.g., 100), such as but not limited to, a touch screen and/or a touchpad. When electrically coupled, sensor pattern 200 provides positioning information from a sensor pattern that has substantially parallel traces (or elements) with no crossovers. The positioning information can be derived from which sensing element detects an object (e.g., a user's finger, a probe, and the like), and the proportional strength of the signals on sensing elements 202, 204, and 206.

Specifically, sensing elements 202, 204, and 206 can be oriented using a single layer of conductive material such that they are substantially parallel to a first axis and their capacitive coupling to the sensor surface can vary periodically along the length of each trace (or sensing element). In one embodiment, the widths of the sensing elements 202, 204, and 206 vary sinusoidally. For example, the widths of sensing elements 202, 204, and 206 can each be a sinusoidal function of position. However, the varying width of each sensing element 202, 204, and 206 can include all or a portion of a sinusoidal waveform. Additionally, the varying width of each sensing element 202, 204, and 206 can include multiple sinusoidal waveforms or any other type of waveform. The sum of the widths of traces 202, 204, and 206 can also be implemented as a substantial constant.

Within FIG. 2, the phases of traces 202, 204, and 206 can each be shifted relative to its neighbors, so that the sum of the traces 202, 204, and 206 produces a complementary set of signals. The sensing elements 202, 204, and 206 can differ in phase by any angle (e.g., substantially 24, 30, 36, 40, 45, 60, 72, 90, or 120 degrees, etc.). Within the present embodiment, sensing elements 202, 204, and 206 are each implemented to include less than one cycle (or period) of a sinusoidal waveform while each has a different phase. In this manner, each of the sensing elements 202, 204, and 206 produces a unique signal along its length. Therefore, the combination of the output signals produced by the sensing elements 202, 204, and 206 can specifically identify the location of an object (e.g., a user's finger, a probe, a stylus, etc.) along the length of sensor pattern 200. It is noted that the sensing elements 202, 204, and 206 are located such that they are not required to overlap each other in order to determine a first location of an object along the first axis of a two-dimensional space.

The shape and phase of the sensing elements 202, 204, and 206 can be implemented in a wide variety of ways. For example, within the present embodiment, if the waveform shape of sensing element 202 is substantially equal to sin θ, then the waveform shape of sensing element 204 may be substantially equal to sin θ+120 degrees, while the waveform shape of sensing element 206 may be substantially equal to sin θ+240 degrees. Alternatively, the waveforms of sensing elements 204 and 206 may each be offset from the waveform of sensing element 202 by 2π/3 radians. However, it is understood that the phase and shape of the waveform of sensing elements 202, 204, and 206 are not in any way limited to the present embodiment.

Figure 4:
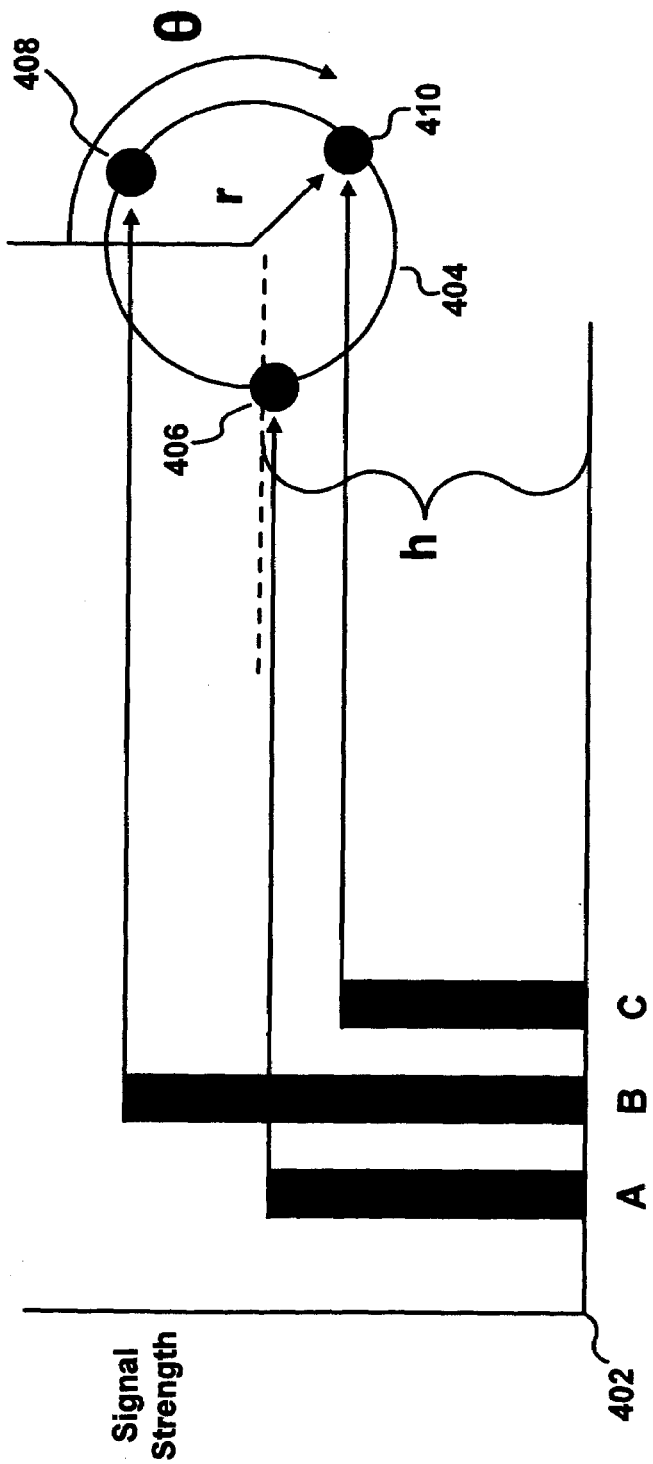
FIG. 4 illustrates an exemplary signal strength chart along with its conversion into polar coordinates in accordance with embodiments of the invention.

There are a wide variety of ways in accordance with the present embodiment for determining a location (or position) of an object in relation to the length of sensor pattern 200 using signals output by sensing elements 202, 204, and 206. For instance, FIG. 4 illustrates an exemplary signal strength chart 402 along with its conversion into polar coordinates in accordance with embodiments of the invention. For example, suppose signal "A" is associated with sensing element 202 (FIG. 2), signal "B" is associated with sensing element 204, and signal "C" is associated with sensing element 206. As such, based on the signal strength shown within chart 402, it can be determined that the object is located along sensor 200 where sensing trace 204 is the widest, the sensing trace 202 is the second widest, and the sensing trace 206 is the third widest. Therefore, within this example, the object is located near the right-hand end of sensor pattern 200.

More specifically, given signal "A" corresponds to sensing element 202, signal "B" corresponds to sensing element 204, and signal "C" corresponds to sensing element 206, as mentioned above. And further suppose that sensing elements (or traces) 202, 204, and 206 have been observed to give values $A_0$, $B_0$, and $C_0$, respectively, when no object is present or near sensor pattern 200. As such, let $a=A-A_0$, $b=B-B_0$, and $c=C-C_0$. Therefore, determination of the polar coordinates "h", "r", and angle θ that are associated with signals A, B, and C can be performed.

Within FIG. 4, it is noted that the value of "h" corresponds to the height of the center of a circle 404 upon which points 406, 408, and 410 can be located. The points 406, 408, and 410 are associated with signals A, B, and C, respectively. The value of "r" corresponds to the radius of circle 404. The value of angle θ can be used to indicate the linear location (or position) of an object in relationship to the length of sensor pattern 200. Specifically, the value of height "h" can be determined by using the following relationship:

$$h=(a+b+c)/3$$

Once "h" has been determined, the radius "r" can then be determined utilizing the following relationship:

$$r=\text{sqrt}((2/3)\times[(a-h)^2+(b-h)^2+(c-h)^2])$$

where "sqrt" represents the square root function. Once "r" has been determined, the angle θ can then be determined utilizing one of the following relationships:

$$\theta = \sin^{-1}((a-h)/r)$$

OR $$\theta = \sin^{-1}((b-h)/r)$$

OR $$\theta = \sin^{-1}((c-h)/r)$$

Once the angle θ has been determined, it can then be converted into a distance that corresponds to a linear position measured along the length of sensor pattern 200 from one of its end points. For example, each degree of angle θ may be equal to a specific distance (e.g., a specific number of millimeters or inches) from one of the end points of sensor pattern 200. Alternatively, a lookup table may be utilized to ascertain the distance that corresponds to the determined θ. It is noted that the angle θ provides the location of the center of the object along sensor pattern 200 while the "h" and the "r" can provide information regarding the size of the object.

One of the advantages of determining the position along the first axis (e.g., X axis) of sensor pattern 200 in the manner described above is that common-mode noise has no effect on the determination of "r" and θ.

Within FIG. 4, it is noted that angle θ can alternatively be determined utilizing the following relationships:

$$\cos\theta = a - (b+c)/2$$

$$\sin\theta = sqrt(3)/2(b-c)$$

$$\theta = ATAN2(\cos\theta, \sin\theta)$$

wherein "ATAN2" represents the arc tangent function. It is appreciated that the above three relationships may be more convenient for use with a smaller microprocessor.

The sensing elements 202, 204, and 206 of sensor pattern 200 can be fabricated with any conductive material on any insulating substrate (e.g., 102). For example, this may include conventional copper/fiberglass printed circuit construction, ITO (indium tin oxide) patterned on glass, screen printed conductor patterned on plastic, and the like. It is noted that the sensor pattern 200 may be used to detect objects on either side of the substrate onto which it is fabricated. To prevent detection of signals of noise from one side of the substrate, a ground plane or a driven shield conductor may be utilized to shield that side.

There are advantages associated with the sensor pattern 200 of FIG. 2. For example, since the manufacture of sensor pattern 200 involves one layer of conductive material, this reduces manufacturing costs relative to the two-layer X-Y grids often used in touchpads. Additionally, in the case of touch screens, doing all the fabrication using only one layer of conductive material eliminates low yield alignment steps. Furthermore, the optical properties of touch screens can also benefit from the use of only one layer of substantially transparent conductive material, such as indium tin oxide (ITO).

It is noted that sensor pattern 200 can be implemented with a greater number of sensing elements than the sensing elements 202, 204, and 206 shown. However, if sensor pattern 200 is implemented with a greater number of sensing elements, the relationships described with reference to FIGS. 4 and 2 would be modified accordingly in order to determine "h", "r", and θ.

Within FIG. 2, it is understood that sensing elements 202, 204, and 206 of the sensor pattern 200 can individually be coupled with sensing circuitry 110 (FIG. 1) utilizing conductive coupling traces 104 and/or 106. When coupled in this manner, the sensor pattern 200 can be utilized to form the sensing region 108.

Figure 3:
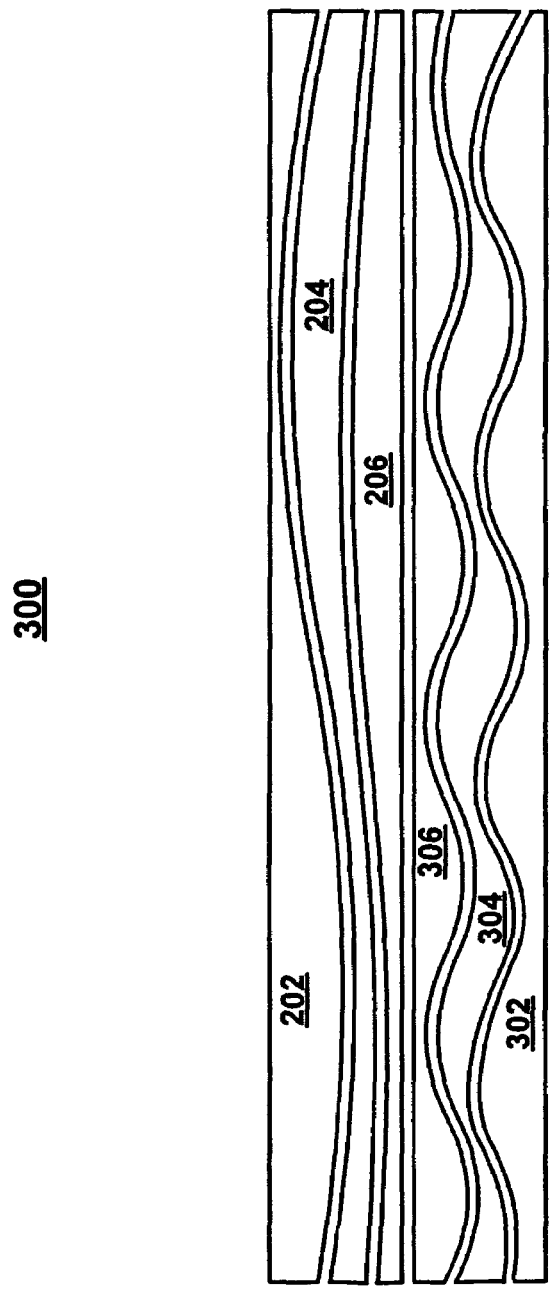
FIG. 3 illustrates another exemplary capacitive sensor pattern in accordance with embodiments of the invention.

FIG. 3 is a plan view of an exemplary capacitive sensor pattern 300 in accordance with embodiments of the invention. When electrically coupled, sensor pattern 300 can provide two-dimensional positioning information that has substantially parallel traces (or elements) with no crossovers. Additionally, sensor pattern 300 includes a low-frequency set of sensing elements (e.g., 202, 204, and 206) and a high-frequency set of sensing elements (e.g., 302, 304, and 306). These two sets can work together to provide "coarse" and "fine" positioning information.

Specifically, sensing elements 202, 204, and 206 can operate in any manner similar to that described above to provide the "coarse" positioning information corresponding to the linear position of an object (e.g., a user's finger, a probe, and the like) in relation to sensor pattern 300. For example, each of the signals associated with sensing elements 202, 204, and 206 can be utilized to determine the angle θ, as described above with reference to FIGS. 2 and 4. In this manner, the "coarse" position along the first axis (e.g., X axis) of sensor pattern 300 is determined to the first order.

The "fine" positioning information, or determination to the second order, can be obtained by utilizing sensing elements 302, 304, and 306. For example, each of the signals associated with sensing elements 302, 304, and 306 can be utilized to determine a second value θ in a manner similar to that described herein with reference to FIGS. 2 and 4. Since sensing elements 302, 304, and 306 include 4 periods (or cycles) of sinusoidal waveforms, the determined second value of θ can represent 4 different locations along traces 302, 304, and 306. However, since the "coarse" location is known with respect to sensing elements 202, 204, and 206, the second value of θ located closest to the "coarse" location can be used. In this manner, this second order determination provides a finer resolution of the location (or position) of the object in relation to sensor pattern 300.

Within FIG. 3, it is noted that sensing elements 202, 204, and 206 of sensor pattern 300 can include a portion of a waveform, along with one or more waveforms. Additionally, sensing elements 302, 304, and 306 of sensor pattern 300 can include any number of waveforms, or a portion of a waveform. It is understood that the sensing elements 302, 304, and 306 can be implemented in any manner that is different than the manner that sensing elements 202, 204, and 206 of sensor pattern 300 are implemented.

The sensing elements 202, 204, 206, 302, 304, and 306 of sensor pattern 300 can be fabricated with any conductive material on any insulating substrate (e.g., 102). For example, this may include conventional copper/fiberglass printed circuit construction, ITO patterned on glass, screen printed conductor patterned on plastic, and the like. It is noted that the sensor pattern 300 may be used to detect objects on either side of the substrate onto which it is fabricated. To prevent detection of signals of noise from one side of the substrate, a ground plane or a driven shield conductor may be utilized to shield that side.

Within FIG. 3, the "low-frequency" (or "coarse") set of sensing elements (e.g., 202, 204, and 206) of sensor pattern 300 can be implemented with a greater number of sensing elements than that shown. Moreover, the "high-frequency" (or "fine") set of sensing elements (e.g., 302, 304, and 306) of sensor pattern 300 can also be implemented with a greater number of sensing elements than that shown. However, if either the "coarse" set of sensing elements or "fine" set of sensing elements or both are implemented with a greater number of sensing elements, the relationships described with reference to FIGS. 2 and 4 would be modified accordingly in order to determine "h", "r", and θ.

It is appreciated that sensing elements 202, 204, 206, 302, 304, and 306 of the sensor pattern 300 can individually be coupled with sensing circuitry 110 (FIG. 1) utilizing conductive coupling traces 104 and/or 106. When coupled in this manner, the sensor pattern 300 can be utilized to form the sensing region 108. It is understood that sensor pattern 300 can be utilized in any manner similar to that described herein, but is not limited to such.

Figure 5:
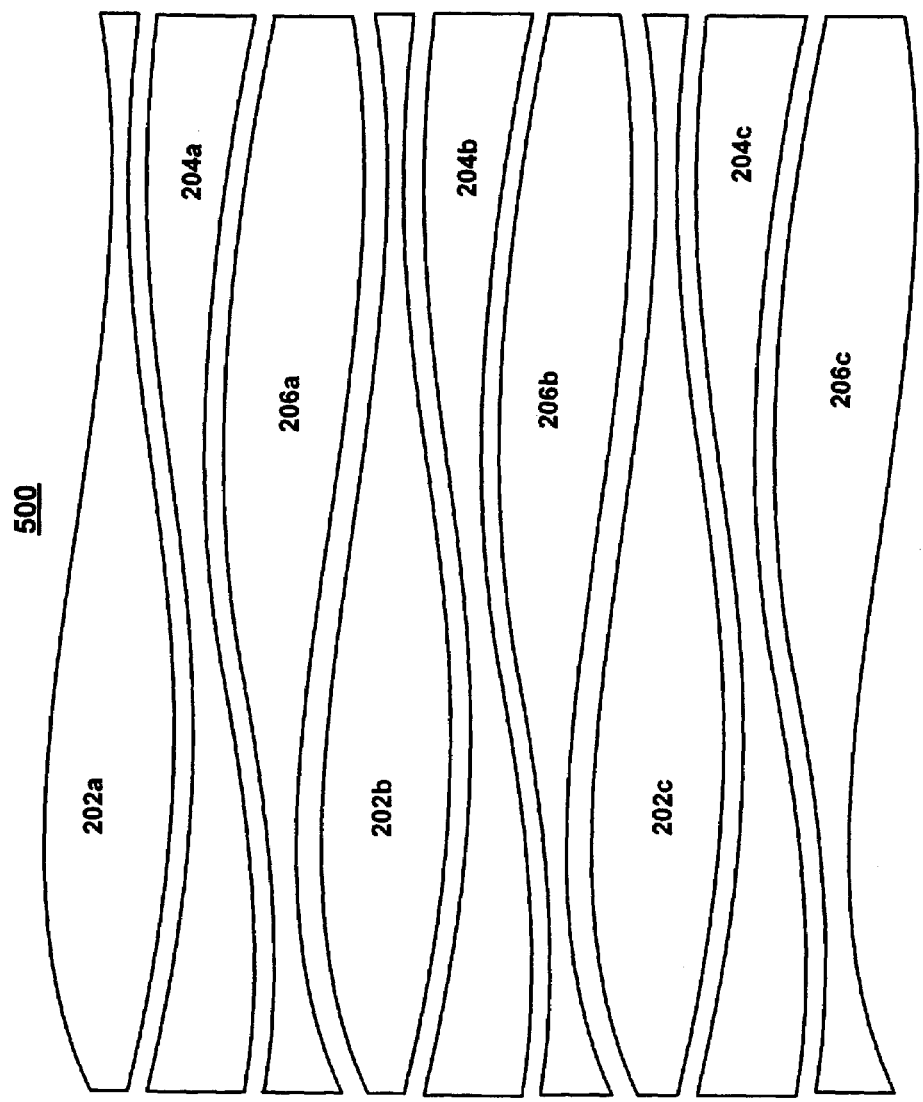
FIG. 5 illustrates yet another exemplary capacitive sensor pattern in accordance with embodiments of the invention.

FIG. 5 is a plan view of an exemplary capacitive sensor pattern 500 in accordance with embodiments of the invention. Specifically, sensor pattern 500 includes three repeated patterns similar to sensing elements 202a, 204a, and 206a having three phases which can be utilized as part of a two-dimensional capacitive sensor apparatus (e.g., 100), such as but not limited to, a touch screen and/or a touchpad. When electrically coupled, sensor pattern 500 can provide two-dimensional positioning information that has substantially parallel traces (or sensing elements) with no crossovers. The sensor pattern 500 can be utilized in any manner similar to that described herein with reference to FIGS. 2 and 4. Additionally, it is noted that any set of three adjacent traces can provide the signals for determining first-axis positioning of an object along the length of sensor pattern 500. Within the present embodiment, sensor pattern 500 includes nine traces which allows for seven sets of three adjacent traces. It is appreciated that sensor pattern 500 can be utilized in any manner similar to that described herein, but is not limited to such.

The sensing elements 202a, 204a, 206a, 202b, 204b, 206b, 202c, 204c, and 206c of sensor pattern 500 have been implemented in a different manner than the sensing elements 202, 204, and 206 of FIGS. 2 and 3. Specifically, each of the sensing elements 202a, 204a, 206a, 202b, 204b, 206b, 202c, 204c, and 206c does not include straight edges along its length. However, the sum of the widths of a set of sensing elements (e.g., 202a, 204a, and 206a) of sensor pattern 500 can be implemented as a substantial constant.

Within FIG. 5, each of the nine sensing elements 202a-206c of the sensor pattern 500 can be individually coupled with sensing circuitry 110 (FIG. 1) utilizing conductive coupling traces 104 and/or 106. When coupled in this manner, the sensor pattern 500 can be utilized to form the sensing region 108. Furthermore, when coupled in this manner, sensor pattern 500 can provide positioning information along a first axis (e.g., X axis), as described herein, and along a second axis (e.g., Y axis).

Specifically, each of the sensing elements 202a-206c of sensor pattern 500 can be utilized for determining a second location along a second axis (e.g., Y axis) that can be substantially perpendicular (or not parallel) to the first axis (e.g., X axis). For example, if sensing element 202a and 204a produce a strong signal while sensing element 204b and 206b produce a very weak signal, the sensing circuitry (e.g., 110) coupled with the sensor pattern 500 can determine that an object is located near sensing element 202a in the Y direction of the two-dimensional space. Alternatively, if sensing element 206c produces a strong signal while sensing element 202b produces a very weak signal, the sensing circuitry can determine that an object is located below or near sensing element 206c in the Y direction of the two-dimensional space. In this manner, sensor pattern 500 can be utilized to provide two coordinate positions associated with a two-dimensional space that correspond to the position of an object in relation to the sensor pattern 500.

Within FIG. 5, all of the similar sensing elements (e.g., 202a, 202b, and 202c) of sensor pattern 500 can be coupled together with sensing circuitry 110 (FIG. 1) utilizing conductive coupling traces 104 and/or 106. When coupled in this manner, the sensor pattern 500 can provide positioning information to the sensing circuitry 110 corresponding to the first axis (e.g. X axis), but not along the second axis (e.g., Y axis).

It is appreciated that sensor pattern 500 can be implemented with a greater or fewer number of sensing elements than shown within the present embodiment. Sensor pattern 500 and its sensing elements 202a, 204a, 206a, 202b, 204b, 206b, 202c, 204c, and 206c can be implemented in any manner similar to that described herein, but is not limited to such.

Within FIG. 5, each set (e.g., 206a, 202b, and 204b) of the sensing elements (e.g., 202a-206c) of sensor pattern 500 can operate in any manner similar to that described herein in order to provide the positioning information corresponding to the linear position of an object (e.g., a user's finger, a probe, and the like) in relation to sensor pattern 500. For example, each set of the signals associated with a set of sensing elements (e.g., 204b, 206b, and 202c) can be utilized to determine the angle θ, as described above with reference to FIGS. 2 and 4. In this manner, the position (or location) along the first axis (e.g., X axis) of sensor pattern 500 can be determined.

Figure 6:
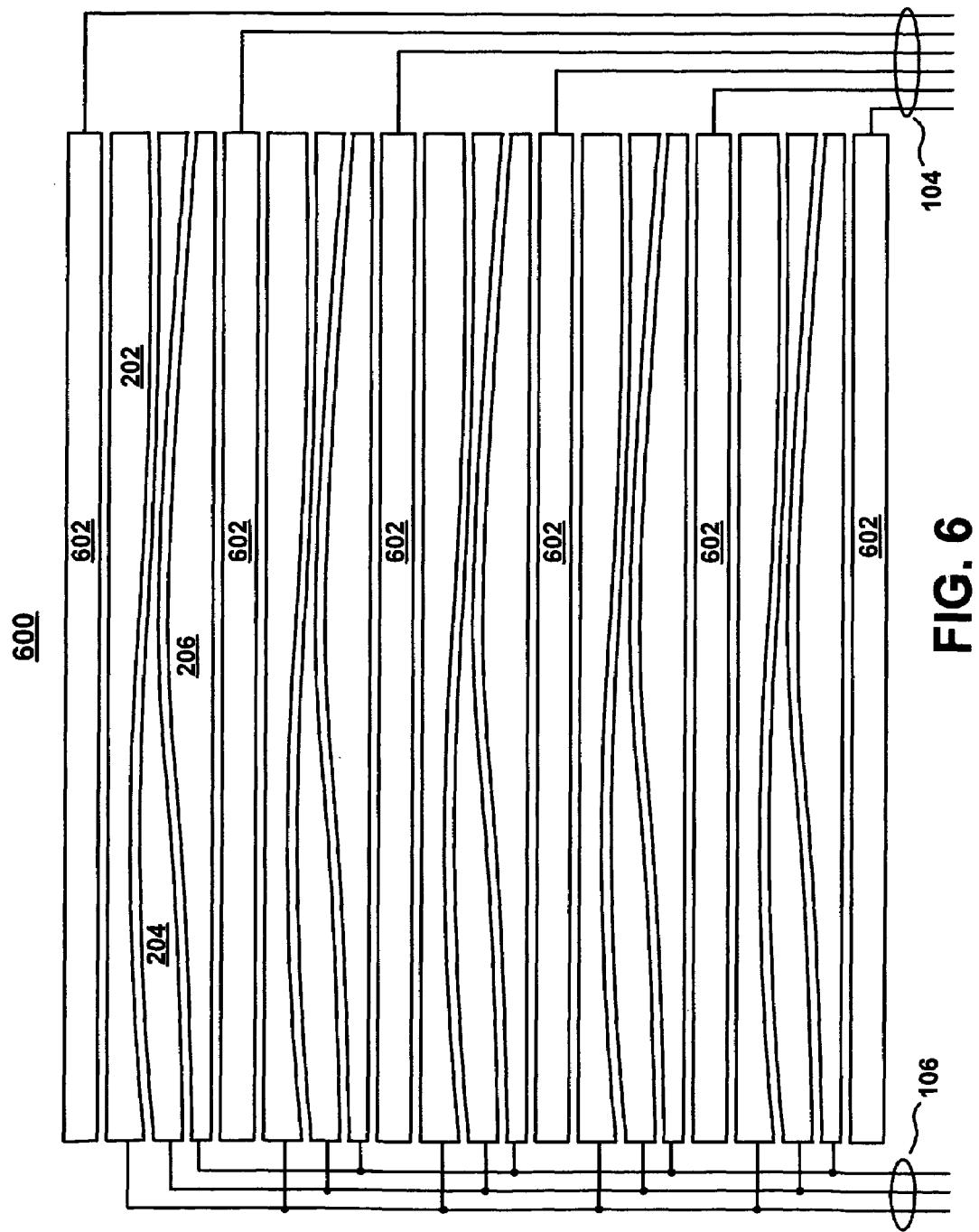
FIG. 6 illustrates still another exemplary capacitive sensor pattern in accordance with embodiments of the invention.

FIG. 6 is a plan view of an exemplary capacitive sensor pattern 600 in accordance with embodiments of the invention. Specifically, sensor pattern 600 includes five repeated patterns of a set of sensing elements 202, 204, and 206 having three phases which can be utilized as part of a two-dimensional capacitive sensor apparatus (e.g., 100), such as but not limited to, a touch screen and/or a touchpad. Additionally, sensor pattern 600 includes second axis (e.g., Y axis) sensing elements 602 that are substantially parallel to the first axis, and interdigitated with each set of sensing elements 202, 204, and 206, and can be utilized for providing position information along the second axis. Sensor pattern 600 can provide two-dimensional positioning information that has substantially parallel traces (or sensing elements) with no crossovers. It is appreciated that sensor pattern 600 can be utilized in any manner similar to that described herein, but is not limited to such.

Each of the similar first axis sensing elements (e.g., 202) of sensor pattern 600 can be coupled together and coupled with sensing circuitry 110 (FIG. 1) utilizing, but not limited to, conductive coupling traces 106. However, each similar first axis sensing element can be coupled together and coupled with sensing circuitry utilizing conductive coupling traces 104 and/or 106. Additionally, each of the second axis sensing elements (e.g., 602) can be coupled independently to sensing circuitry utilizing, but not limited to, conductive coupling traces 104. However, each of the second axis sensing elements 602 can be coupled individually with sensing circuitry utilizing conductive coupling traces 104 and/or 106. When coupled in this manner, the second axis sensing elements 602 can operate to provide positioning information corresponding to the second axis position of an object (e.g., a user finger, a probe, a stylus, etc.) relative to sensor pattern 600. Therefore, when coupled in this manner, the sensor pattern 600 can provide positioning information to the sensing circuitry corresponding to the first axis (e.g. X axis) along with the second axis (e.g., Y axis). It is noted that the second axis is not parallel to the first axis and may be substantially perpendicular to it. The sensor pattern 600 can be utilized to form the sensing region 108.

Alternatively, each of the first axis sensing elements (e.g., 202, 204, and 206) of the sensor pattern 600 can be individually coupled with sensing circuitry 110 (FIG. 1) utilizing conductive coupling traces 104 and/or 106. When coupled in this manner, the sensor pattern 600 can be utilized to form the sensing region 108. Moreover, when coupled in this manner, the first axis sensing elements (e.g., 202, 204, and 206) of sensor pattern 600 can provide positioning information for both the first axis (e.g., X axis) and second axis (e.g., Y axis) since each trace can produce a signal that is individually detected by the sensing circuitry. However, when coupled in this manner, sensor pattern 600 can be implemented without the second axis sensing elements 602.

Sensor pattern 600 can be implemented with a greater or fewer number of sensing elements than shown within the present embodiment. Sensor pattern 600 and its sensing elements can be implemented in any manner similar to that described herein, but is not limited to such.

Within FIG. 6, each set of the first axis sensing elements (e.g., 202, 204, and 206) of sensor pattern 600 can operate in any manner similar to that described herein in order to provide the positioning information corresponding to the linear position of an object (e.g., a user's finger, a probe, and the like) in relation to sensor pattern 600. For example, each set of the signals associated with a set of sensing elements (e.g., 202, 204, and 206) can be utilized to determine the angle θ, as described above with reference to FIGS. 2 and 4. In this manner, the position (or location) along the first axis (e.g., X axis) of sensor pattern 600 is determined.

Figure 7:
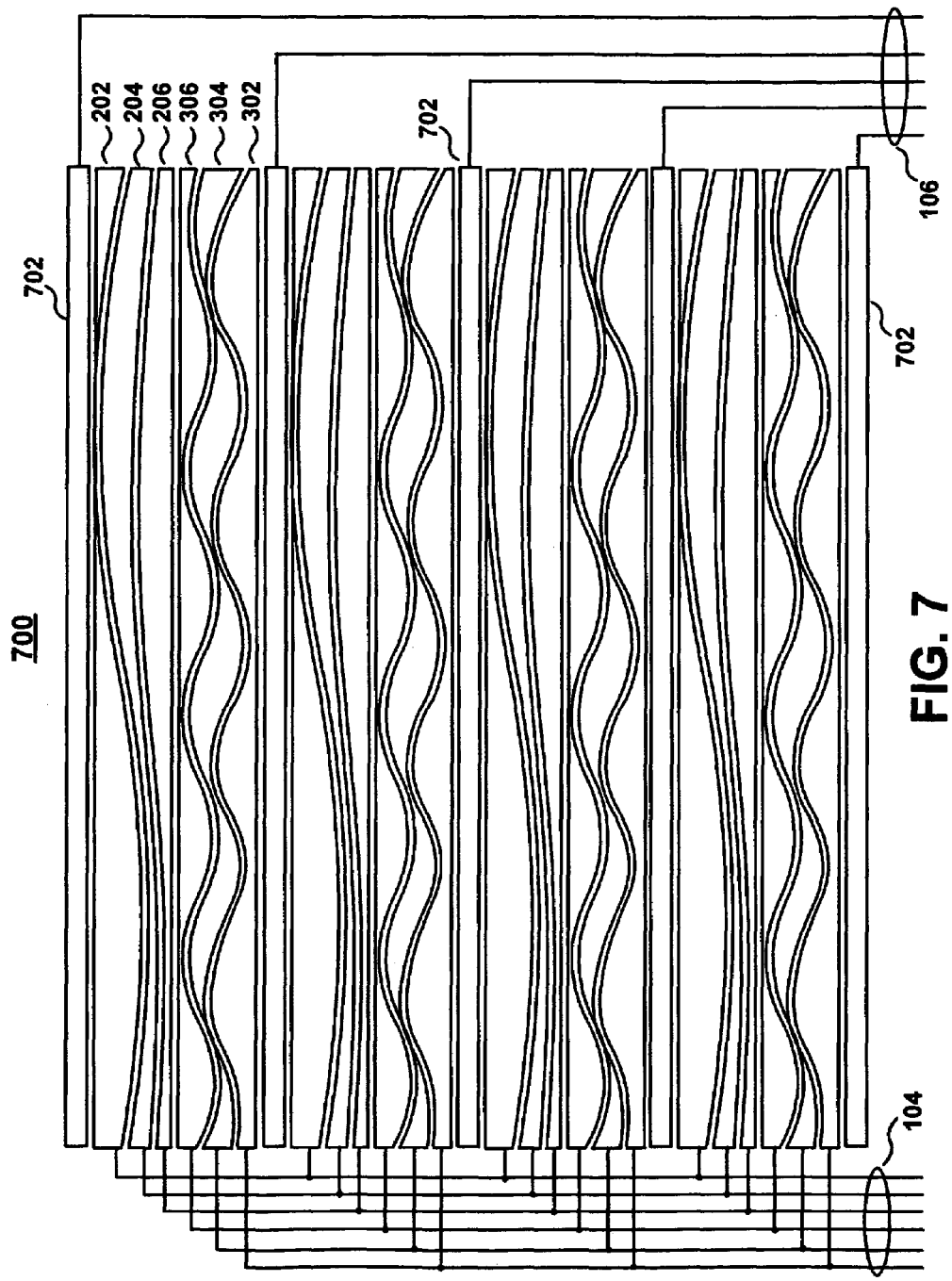
FIG. 7 illustrates another exemplary capacitive sensor pattern in accordance with embodiments of the invention.

FIG. 7 is a plan view of an exemplary capacitive sensor pattern 700 in accordance with embodiments of the invention. Specifically, sensor pattern 700 includes four repeated patterns of "coarse" and "fine" sets of sensing elements 202, 204, 206, 302, 304, and 306 which can be utilized as part of a two-dimensional capacitive sensor apparatus (e.g., 100), such as but not limited to, a touch screen and/or a touchpad. Additionally, sensor pattern 700 includes second axis (e.g., Y axis) sensing elements 702 that are substantially parallel to the first axis, interdigitated with each set of sensing elements 202, 204, 206, 302, 304, and 306, and can be utilized for providing position information along the second axis. Sensor pattern 700 can provide two-dimensional positioning information that has substantially parallel traces (or sensing elements) with no crossovers. It is noted that sensor pattern 700 can be utilized in any manner similar to that described herein, but is not limited to such.

Each of the similar first axis sensing elements (e.g., 302) of sensor pattern 700 can be coupled together and coupled with sensing circuitry 110 (FIG. 1) utilizing, but not limited to, conductive coupling traces 104. However, each similar first axis sensing element can be coupled together and coupled with sensing circuitry utilizing conductive coupling traces 104 and/or 106. Furthermore, each of the second axis sensing elements (e.g., 702) can be coupled independently to sensing circuitry utilizing, but not limited to, conductive coupling traces 106. However, each of the second axis sensing elements 702 can be coupled individually with sensing circuitry utilizing conductive coupling traces 104 and/or 106. When coupled in this manner, the sensor pattern 700 can be utilized to form the sensing region 108. Additionally, when coupled in this manner, the sensor pattern 700 can provide positioning information to the sensing circuitry corresponding to the first axis (e.g. X axis) along with the second axis (e.g., Y axis). It is noted that the second axis is not parallel to the first axis and may be substantially perpendicular to it.

Alternatively, each of the first axis sensing elements (e.g., 202, 204, 206, 302, 304, and 306) of the sensor pattern 700 can be individually coupled with sensing circuitry 110 (FIG. 1) utilizing conductive coupling traces 104 and/or 106. When coupled in this manner, the sensor pattern 700 can be utilized to form the sensing region 108. Furthermore, when coupled in this manner, the first axis sensing elements (e.g., 202, 204, 206, 302, 304, and 306) of sensor pattern 700 can provide positioning information for both the first axis (e.g., X axis) and second axis (e.g., Y axis) since each trace can produce a signal that is individually detected by the sensing circuitry. However, when coupled in this manner, sensor pattern 700 can be implemented without the second axis sensing elements 702.

Sensor pattern 700 can be implemented with a greater or fewer number of sensing elements than shown within the present embodiment. Sensor pattern 700 and its sensing elements can be implemented in any manner similar to that described herein, but is not limited to such.

Within FIG. 7, each set of the first axis sensing elements (e.g., 202, 204, 206, 302, 304, and 306) of sensor pattern 700 can operate in any manner similar to that described herein to provide the positioning information corresponding to the linear position of an object (e.g., a user's finger, a probe, and the like) in relation to sensor pattern 700. For example, each set of the signals associated with a set of sensing elements (e.g., 202, 204, and 206) can be utilized to determine the angle θ, as described above with reference to FIGS. 2 and 4. In this manner, the position (or location) along the first axis (e.g., X axis) of sensor pattern 700 is determined.

Figure 8:
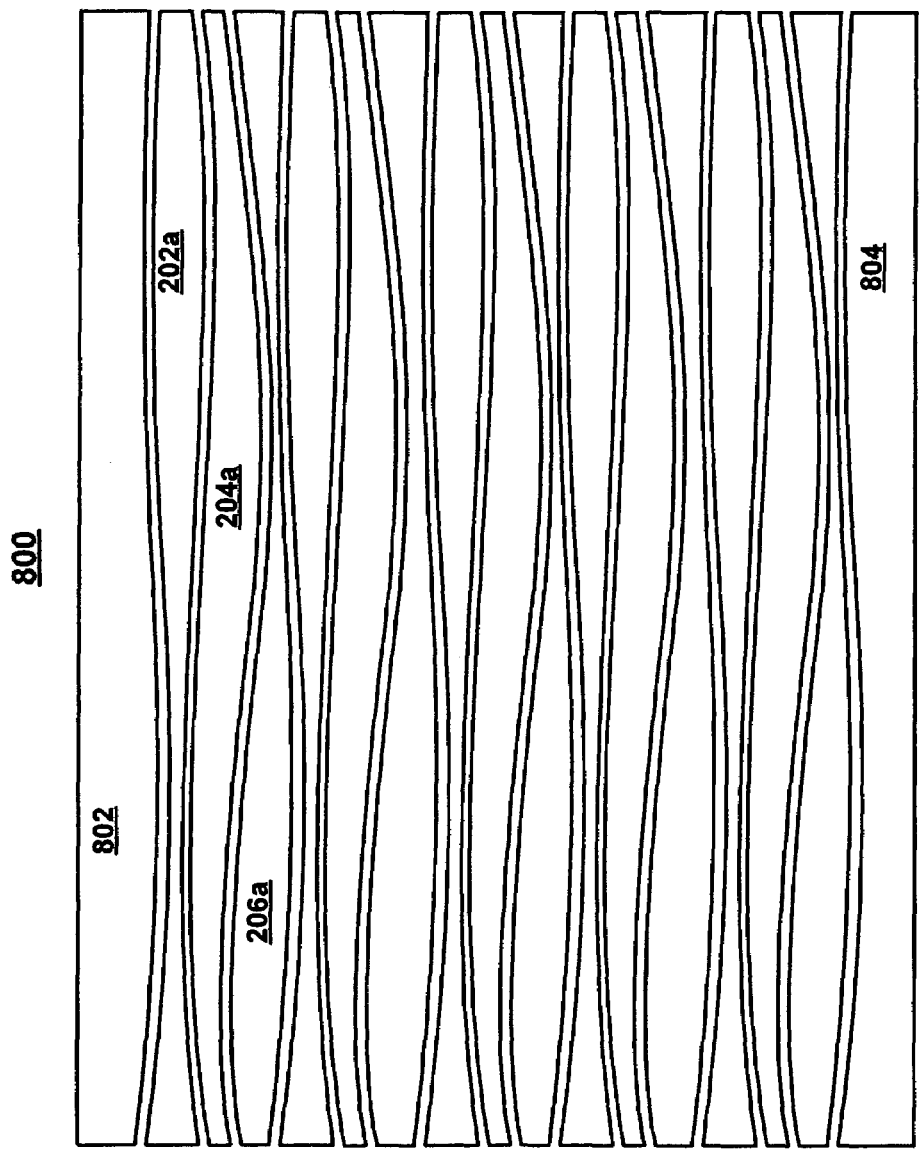
FIG. 8 illustrates yet another exemplary capacitive sensor pattern in accordance with embodiments of the invention.

FIG. 8 is a plan view of an exemplary capacitive sensor pattern 800 in accordance with embodiments of the invention. Specifically, sensor pattern 800 includes guard traces 802 and 804 along with five repeated patterns of sensing elements 202a, 204a, and 206a having three phases which can be utilized as part of a two-dimensional capacitive sensor apparatus (e.g., 100), such as, but not limited to, a touch screen and/or a touchpad. When electrically coupled, sensor pattern 800 can provide two-dimensional positioning information that has substantially parallel traces (or sensing elements) with no crossovers. The sensor pattern 800 can be utilized in any manner similar to that described herein, but is not limited to such.

It is noted that the five repeated patterns of sensing elements 202a, 204a, and 206a can operate in any manner similar to sensor pattern 500 of FIG. 5, described herein. However, sensor pattern 800 of FIG. 8 also includes guard traces 802 and 804 which are located at the "top" and "bottom", respectively, of sensor pattern 800 thereby enabling the "edge" sensing elements located near them to operate in a manner similar to those sensing elements more centrally located within sensor pattern 800. The guard traces 802 and 804 may be electrically driven, grounded, and/or held at a substantially fixed or constant potential in accordance with embodiments of the present invention.

For example, guard traces 802 and 804 of FIG. 8 may be coupled to ground; in this manner, guard traces 802 and 804 are functioning as grounded traces. Alternatively, guard traces 802 and 804 may be coupled to a constant potential signal; in this manner, guard traces 802 and 804 are functioning as constant potential traces. Guard traces 802 and 804 may also be actively driven; in this manner, guard traces 802 and 804 are functioning as driven guard traces. It is understood that guard traces 802 and 804 may be implemented in a wide variety of ways in accordance with the present embodiment.

It is noted that guard traces (or grounded or fix potential traces) similar to guard traces 802 and 804 can also be included as part of or with any sensing pattern described herein.

Figure 9:
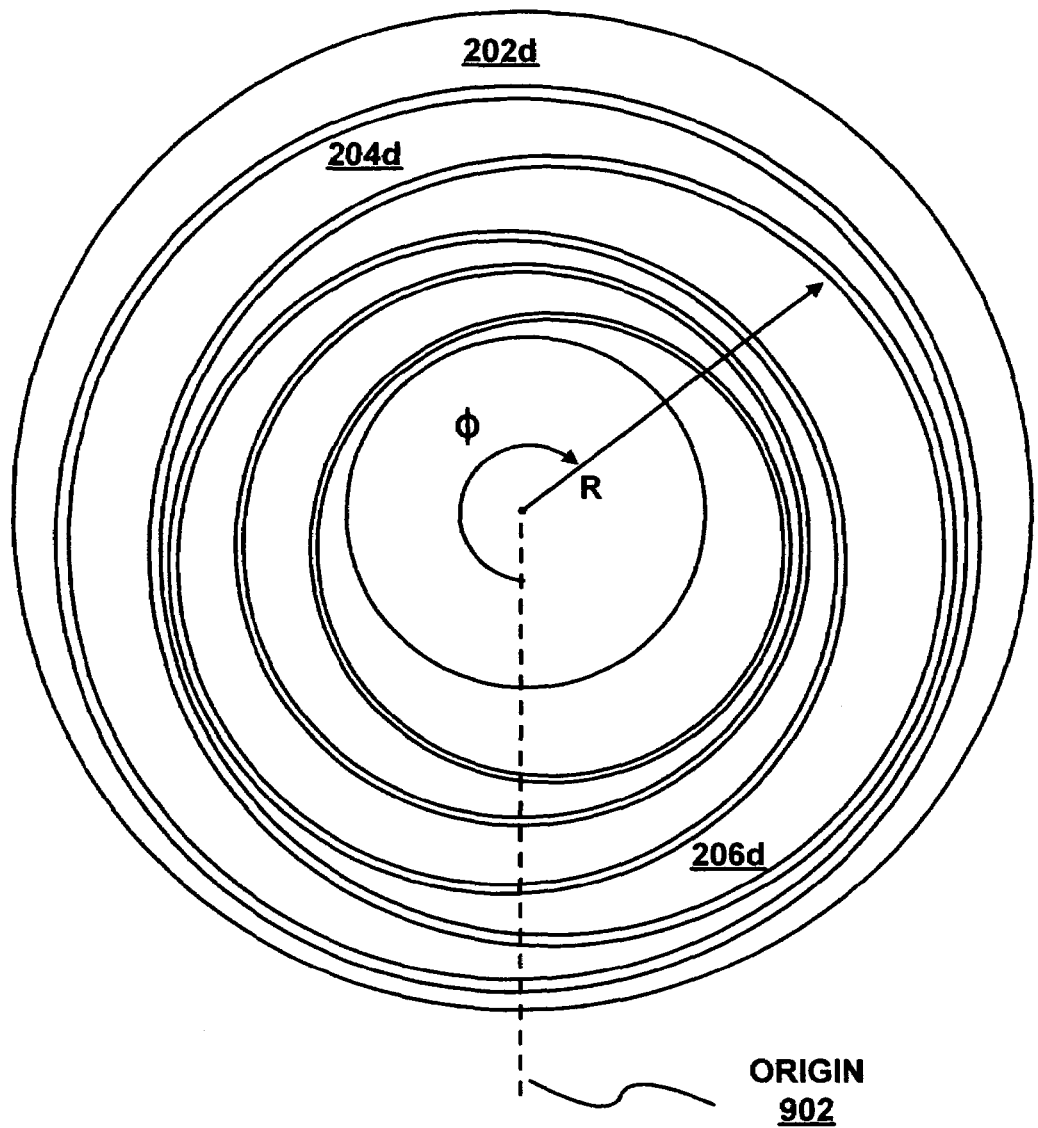
FIG. 9 illustrates an exemplary loop capacitive sensor pattern in accordance with embodiments of the invention.

FIG. 9 is a plan view of an exemplary loop capacitive sensor pattern 900 in accordance with embodiments of the invention. Specifically, sensor pattern 900 includes two sets of concentric loop patterns of three sensing elements 202*d*, 204*d*, and 206*d* having three phases which can be utilized as part of a two-dimensional capacitive sensor apparatus (e.g., 100), such as but not limited to, a touch screen and/or a touchpad. When electrically coupled, sensor pattern 900 can provide continuous two-dimensional positioning information that has sensing elements with varying width and no crossovers. The sensor pattern 900 can be utilized in any manner similar to that described herein, but is not limited to such.

Specifically, each of the sensing elements 202*d*, 204*d*, and 206*d* has varying width and form a substantially circular (or loop) pattern. It is noted that a loop pattern may include any closed loop sensor pattern shape (e.g., circle, square, rectangle, triangle, polygon, etc.), radial arc sensor pattern, a semi-circle sensor pattern, and/or any sensor pattern that is not substantially in a straight line. The sensing elements 202*d*, 204*d*, and 206*d* are not required to overlap each other in order to determine an angular position φ of an object relative to the substantially circular pattern (e.g., loop) in a two-dimensional space. It is noted that the angular position φ starts at an origin 902 which can be located anywhere associated with sensor pattern 900. The sensing elements 202*d*, 204*d*, and 206*d* provide a cumulative output signal that is substantially constant at different locations along the traces 202*d*, 204*d*, and 206*d*.

Within FIG. 9, the sensing elements 202*d*, 204*d*, and 206*d* can each include a conductive trace. Furthermore, each set of sensing elements (e.g., 202*d*, 204*d*, and 206*d*) can be used for determining a radial position "R" of the object relative to the loop in the two-dimensional space.

It is understood that each of the sensing elements (e.g., 202*d*, 204*d*, and 206*d*) of the sensor pattern 900 can be individually coupled with sensing circuitry 110 (FIG. 1) utilizing conductive coupling traces 104 and/or 106. When coupled in this manner, the sensor pattern 900 can be utilized to form the sensing region 108. Furthermore, when coupled in this manner, sensor pattern 900 can provide positioning information along the angular position φ and the radial position "R".

Alternatively, all similar sensing elements (e.g., 202*d*) of sensor pattern 900 can be coupled together and coupled with sensing circuitry 110 (FIG. 1) utilizing conductive coupling traces 104 and/or 106. When coupled in this manner, the sensor pattern 900 can provide positioning information to the sensing circuitry corresponding to the angular position φ, but not of the radial position "R". It is understood that the radial position "R" can be determined in any manner similar to the way the second axis position can be determined, as described herein.

It is appreciated that sensor pattern 900 can be implemented with a greater or fewer number of sensing elements than shown within the present embodiment. For example, sensor pattern 900 can be implemented with a single set of sensing elements 202*d*, 204*d*, and 206*d*. Alternatively, sensor pattern 900 can be implemented with multiple sets of sensing elements 202*d*, 204*d*, and 206*d*. Sensor pattern 900 and its sensing elements can be implemented in any manner similar to that described herein, but is not limited to such.

Within FIG. 9, each set of the sensing elements (e.g., 202*d*, 204*d*, and 206*d*) of sensor pattern 900 can operate in any manner similar to that described herein in order to provide the positioning information corresponding to the angular position φ of an object (e.g., a user's finger, a probe, a stylus, and the like) in relation to sensor pattern 900. For example, each set of the signals associated with a set of sensing elements (e.g., 202*d*, 204*d*, and 206*d*) can be utilized to determine the phase angle θ, in a manner similar to that described herein with reference to FIGS. 2 and 4. It is noted that once the phase angle θ has been determined, it may be converted into a geometric position angle φ relative to the origin 902. In this manner, the angular position φ of an object is determined relative to sensor pattern 900.

It is noted that "coarse" or "fine" waveform patterns may have wavelengths that differ from the circumference of the loop sensor.

Figure 10:
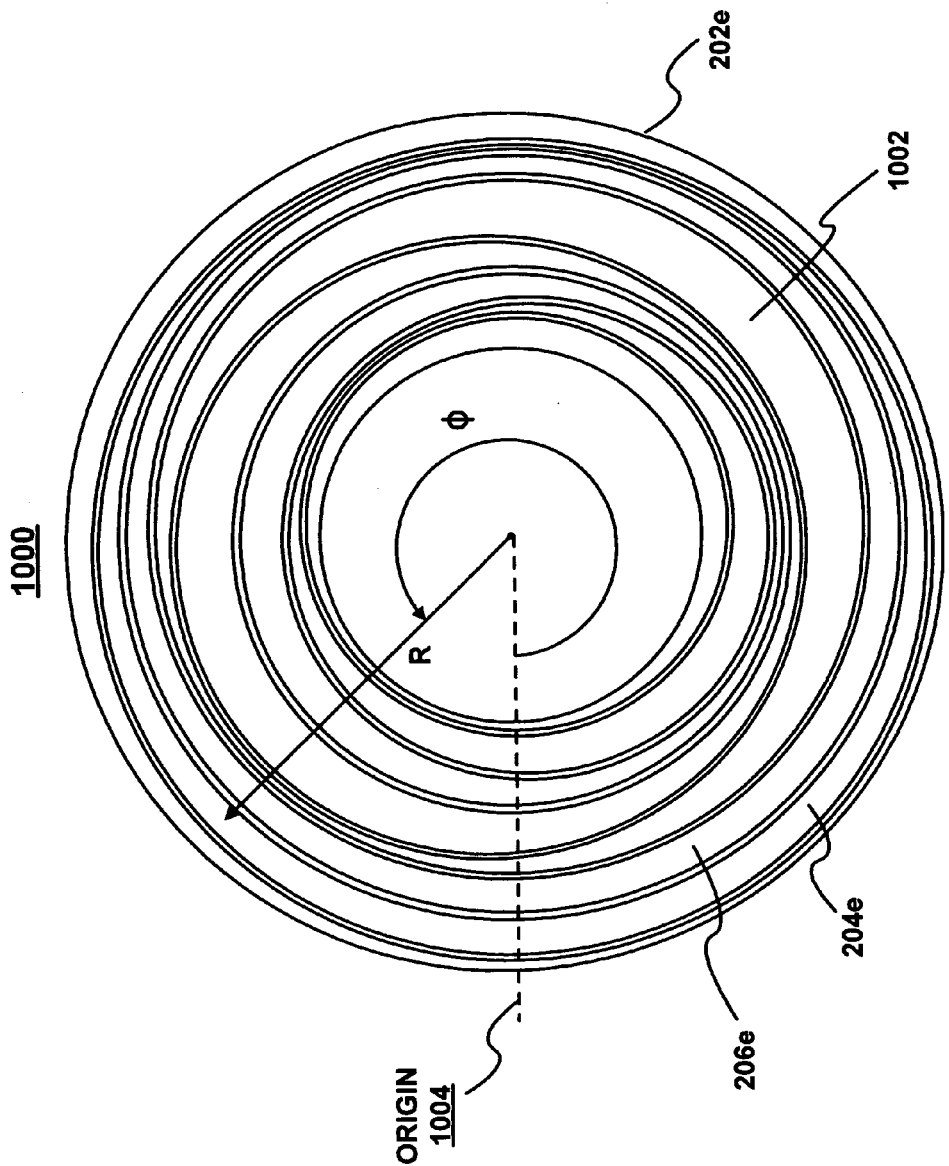
FIG. 10 illustrates another exemplary loop capacitive sensor pattern in accordance with embodiments of the invention.

FIG. 10 is a plan view of an exemplary loop capacitive sensor pattern 1000 in accordance with embodiments of the invention. Specifically, sensor pattern 1000 includes two sets of concentric loop patterns of four sensing elements 202*e*, 204*e*, 206*e*, and 1002 having four phases which can be utilized as part of a two-dimensional capacitive sensor apparatus (e.g., 100), such as but not limited to, a touch screen and/or a touchpad. When electrically coupled, sensor pattern 1000 can provide continuous two-dimensional positioning information that has sensing elements with varying width and no crossovers. The sensor pattern 1000 can be utilized in any manner similar to that described herein, but is not limited to such.

Specifically, each of the sensing elements 202*e*, 204*e*, 206*e*, and 1002 has varying width and form a substantially circular (or loop) pattern. It is noted that sensing element 1002 can operate and be implemented in any manner similar to that described herein with reference to a sensing element. A loop pattern can include any closed loop sensor pattern shape (e.g., circle, square, rectangle, triangle, polygon, etc.), radial arc sensor pattern, a semi-circle sensor pattern, and/or any sensor pattern that is not substantially in a straight line. The sensing elements 202*e*, 204*e*, 206*e*, and 1002 are not required to overlap each other in order to determine an angular position φ of an object relative to the substantially circular pattern (e.g., loop) in two-dimensional space. The angular position φ starts at an origin 1004 which can be located anywhere associated with sensor pattern 1000. The sensing elements 202*e*, 204*e*, 206*e*, and 1002 provide a cumulative output signal that is substantially constant at different locations along the traces 202*e*, 204*e*, 206*e*, and 1002.

Within FIG. 10, the sensing elements 202*e*, 204*e*, 206*e*, and 1002 can each include a non-conductive region formed by two or more adjacent elements. Additionally, the sensing elements 202*e*, 204*e*, 206*e*, and 1002 can each include a conductive trace. Furthermore, each set of sensing elements (e.g., 202*e*, 204*e*, 206*e*, and 1002) can also be used for determining a radial position "R" of the object relative to the pattern 1000 in the two-dimensional space.

It is understood that each of the sensing elements (e.g., 202*e*, 204*e*, 206*e*, and 1002) of the sensor pattern 1000 can be individually coupled with sensing circuitry 110 (FIG. 1) utilizing conductive coupling traces 104 and/or 106. When coupled in this manner, the sensor pattern 800 can be utilized to form the sensing region 108. Furthermore, when coupled in this manner, sensor pattern 1000 can provide positioning information along the angular position φ and the radial position "R".

Alternatively, all similar sensing elements (e.g., 202e) of sensor pattern 1000 can be coupled together and coupled with sensing circuitry 110 (FIG. 1) utilizing conductive coupling traces 104 and/or 106. When coupled in this manner, the sensor pattern 1000 can provide positioning information to the sensing circuitry corresponding to the angular position φ, but not of the radial position "R". It is understood that the radial position "R" can be determined in any manner similar to the way the second axis position can be determined, as described herein.

It is appreciated that sensor pattern 1000 can be implemented with a greater or fewer number of sensing elements than shown within the present embodiment. Sensor pattern 1000 and its sensing elements can be implemented in any manner similar to that described herein, but is not limited to such.

Within FIG. 10, each set of the sensing elements (e.g., 202e, 204e, 206e, and 1002) of sensor pattern 1000 can operate in any manner similar to that described herein in order to provide the positioning information corresponding to the angular position φ of an object (e.g., a user's finger, a probe, a stylus, and the like) in relation to sensor pattern 1000. For example, each set of the signals associated with a set of sensing elements (e.g., 202e, 204e, 206e, and 1002) can be utilized to determine the phase angle θ, in a manner similar to that as described herein with reference to FIGS. 2 and 4. Once the phase angle θ has been determined, it may be converted into a geometric position angle φ, relative to the origin 1004. In this manner, the angular position φ of an object relative to sensor pattern 1000 is determined.

Figure 11:
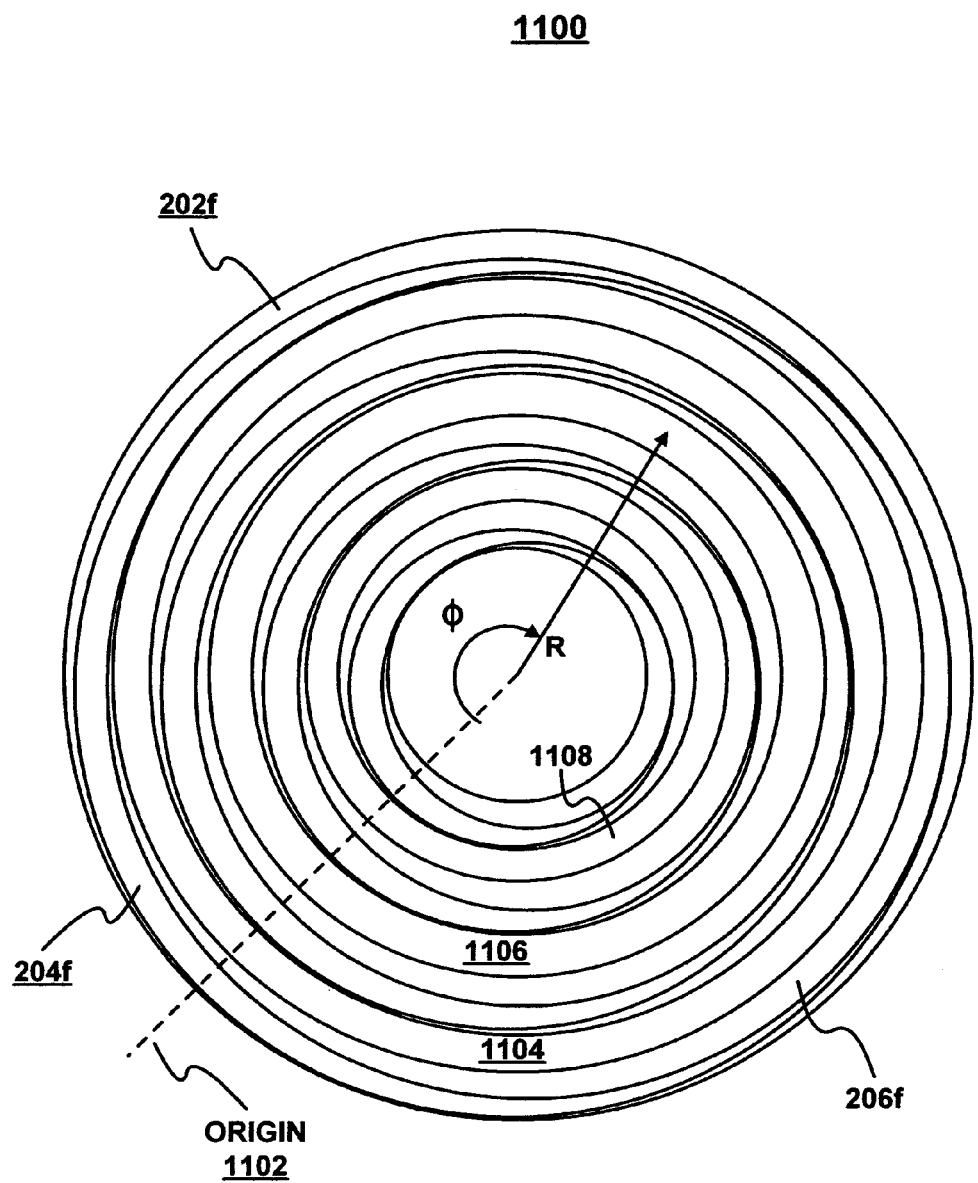
FIG. 11 illustrates yet another exemplary loop capacitive sensor pattern in accordance with embodiments of the invention.

FIG. 11 is a plan view of an exemplary loop capacitive sensor pattern 1100 in accordance with embodiments of the invention. Specifically, sensor pattern 1100 includes substantially "fixed" width sensing elements 1104, 1106, and 1108 along with four sets of concentric loop patterns of three sensing elements 202f, 204f, and 206f having three phases which can be utilized as part of a two-dimensional capacitive sensor apparatus (e.g., 100), such as but not limited to, a touch screen and/or a touchpad. When electrically coupled, sensor pattern 1100 can provide continuous two-dimensional positioning information that includes sensing elements with varying width and no crossovers. The sensor pattern 1100 can be utilized in any manner similar to that described herein, but is not limited to such.

Each of the "fixed" width sensing elements 1104, 1106, and 1108 of sensor pattern 1100 can be individually coupled with sensing circuitry 110 (FIG. 1) utilizing conductive coupling traces 104 and/or 106. When coupled in this manner, sensing elements 1104, 1106, and 1108 can be utilized to provide positioning information to the sensing circuitry 110 associated with the radial position "R" of an object (e.g., a user's finger, a probe, a stylus, and the like) in relation to sensor pattern 1100. Additionally, each of the similar sensing elements of the four sets of sensing elements 202f, 204f, and 206f can be coupled together and coupled with sensing circuitry 110 (FIG. 1) utilizing conductive coupling traces 104 and/or 106. When coupled in this manner, the four sets of sensing elements 202f, 204f, and 206f can provide positioning information to the sensing circuitry 110 corresponding to the angular position φ of the object relative to an origin 1102.

Therefore, the constant width sensing elements 1104, 1106, and 1108 of FIG. 11 can provide radial position "R" information to the sensing circuitry corresponding to the object while the four sets of sensing elements 202f, 204f, and 206f can provide angular position φ information to the sensing circuitry associated with the sensor.

It is noted that each of the "fixed" width sensing elements 1104, 1106, and 1108 of sensor pattern 1100 are implemented with a width that is substantially fixed or constant. It is understood that the radial position "R" of sensor pattern 1100 can be determined in any manner similar to the way the second axis position can be determined, as described herein. The origin 1102 can be located anywhere with respect to sensor pattern 1100.

Figure 12:
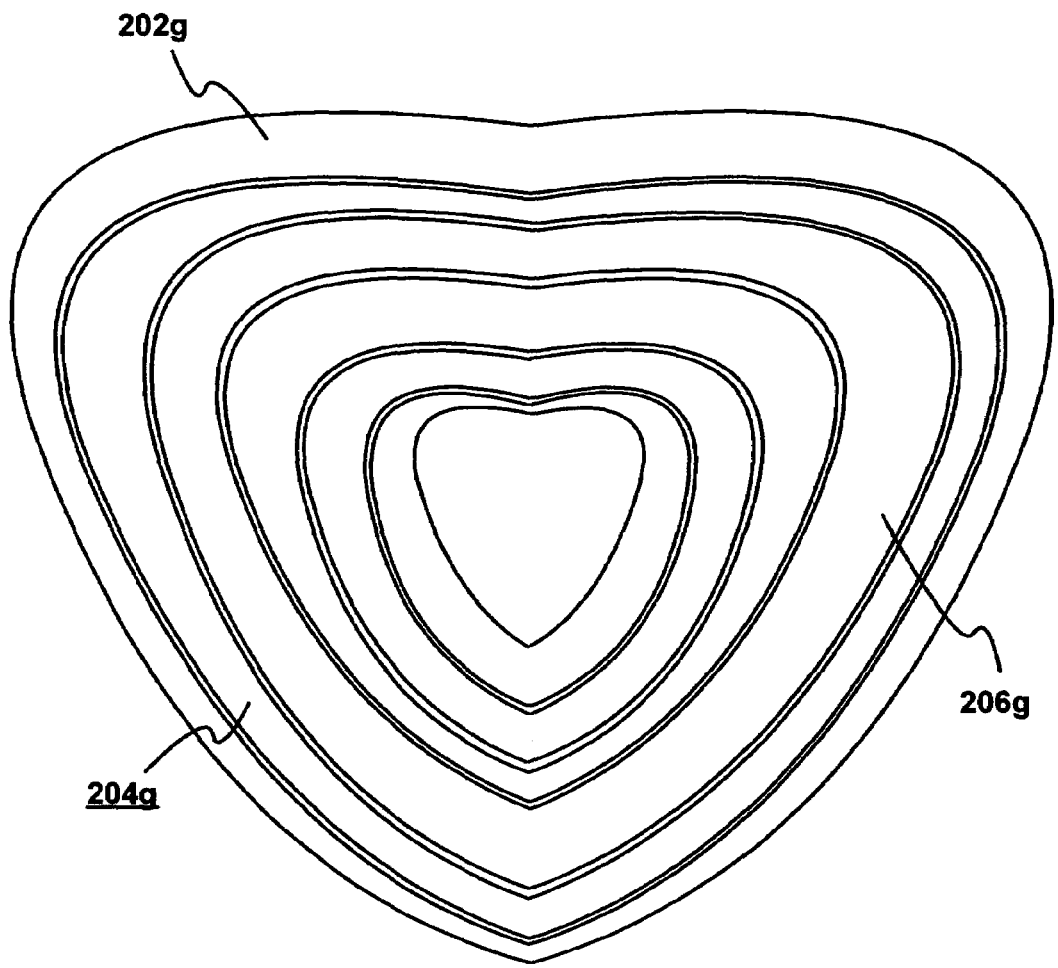
FIG. 12 illustrates still another exemplary loop capacitive sensor pattern in accordance with embodiments of the invention.

FIG. 12 is a plan view of an exemplary loop capacitive sensor pattern 1200 in accordance with embodiments of the invention. Specifically, sensor pattern 1200 includes two sets of non-concentric loop patterns of three sensing elements 202g, 204g, and 206g having three phases which can be utilized as part of a two-dimensional capacitive sensor apparatus (e.g., 100), such as but not limited to, a touch screen and/or a touchpad. When electrically coupled, sensor pattern 1200 can provide continuous two-dimensional positioning information that has sensing elements with varying width and no crossovers. The sensor pattern 1200 can be utilized in any manner similar to that described herein, but is not limited to such.

It is noted that sensor pattern 1200 can operate in any manner similar to sensor pattern 900 of FIG. 9. Furthermore, it is appreciated that the sum of the widths of any three adjacent traces (or sensing elements) of sensor pattern 1200 can be implemented as a substantial constant width. The sensor pattern 1200 can be implemented with a greater or fewer number of sensing elements than shown within the present embodiment. Sensor pattern 1200 and its sensing elements can be implemented in any manner similar to that described herein, but is not limited to such.

Figure 13:
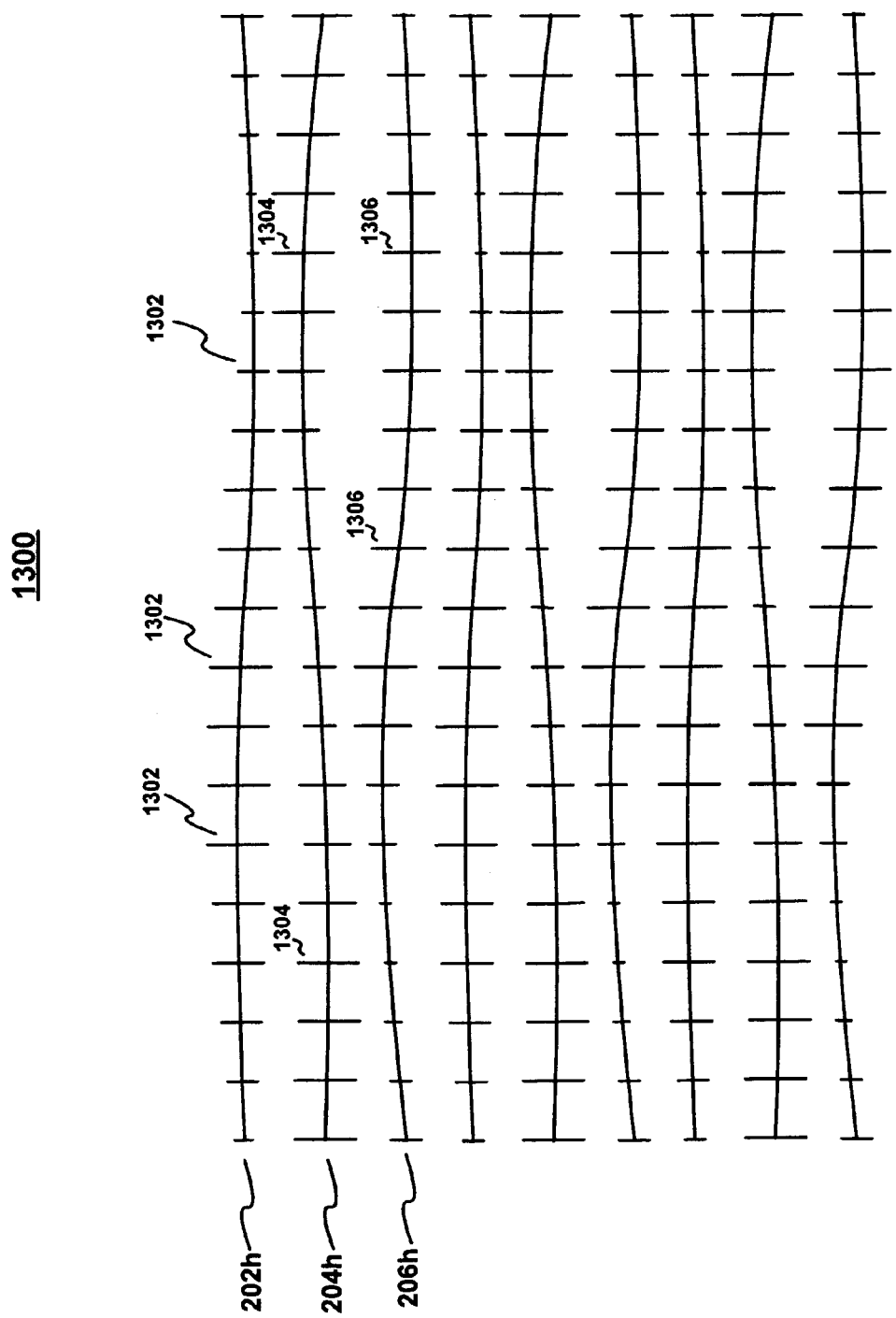
FIG. 13 illustrates an exemplary "fishbone" capacitive sensor pattern in accordance with embodiments of the invention.

FIG. 13 is a plan view of an exemplary "fishbone" capacitive sensor pattern 1300 in accordance with embodiments of the invention. Specifically, sensor pattern 1300 includes three repeated patterns of sensing elements 202h, 204h, and 206h having three phases which can be utilized as part of a two-dimensional capacitive sensor apparatus (e.g., 100), such as but not limited to, a touch screen and/or a touchpad. When electrically coupled, sensor pattern 1300 can provide two-dimensional positioning information that has substantially parallel traces (or sensing elements) with no crossovers. The sensor pattern 1300 can be utilized in any manner similar to that described herein with reference to FIGS. 2 and 4. Additionally, sensor pattern 1300 can be utilized in any manner similar to that described herein, but is not limited to such.

Specifically, sensing element 202h includes a plurality of extensions 1302 that are substantially parallel to each other and are substantially perpendicular (or non-parallel) to a first axis of sensing element 202h. It is noted that the plurality of extensions 1302 cumulatively defines an envelope the shape of a first waveform. The sensing element 204h includes a plurality of extensions 1304 that are substantially parallel to each other and are substantially perpendicular (or non-parallel) to the first axis of sensing element 204h. It is understood that the plurality of extensions 1304 cumulatively defines an envelope the shape of a second waveform. The sensing element 206h includes a plurality of extensions 1306 that are substantially parallel to each other and are substantially perpendicular (or non-parallel) to the first axis of sensing element 206h. It is appreciated that the plurality of extensions 1306 cumulatively defines an envelope the shape of a third waveform.

The repeated sets of sensing elements 202*h*, 204*h*, and 206*h* can be used for determining a first location of an object (e.g., a user's finger, a probe, a stylus, and the like) in relation to sensor pattern 1300 along the first axis of a two-dimensional space. Furthermore, the repeated sets of sensing elements 202*h*, 204*h*, and 206*h* can be used for determining first and second locations of an object in relation to sensor pattern 1300 along the first axis and a second axis of the two-dimensional space, wherein the second axis is substantially non-parallel (or substantially perpendicular) to the first axis.

Within FIG. 13, sensor pattern 1300 can operate in any manner similar to sensor pattern 500 of FIG. 5. Furthermore, it is appreciated that the sum of the widths of any three adjacent traces (or sensing elements) of sensor pattern 1300 can be implemented as a substantial constant width. The sensor pattern 1300 can be implemented with a greater or fewer number of sensing elements than shown within the present embodiment. Sensor pattern 1300 and its sensing elements can be implemented in any manner similar to that described herein, but is not limited to such.

Figure 14:
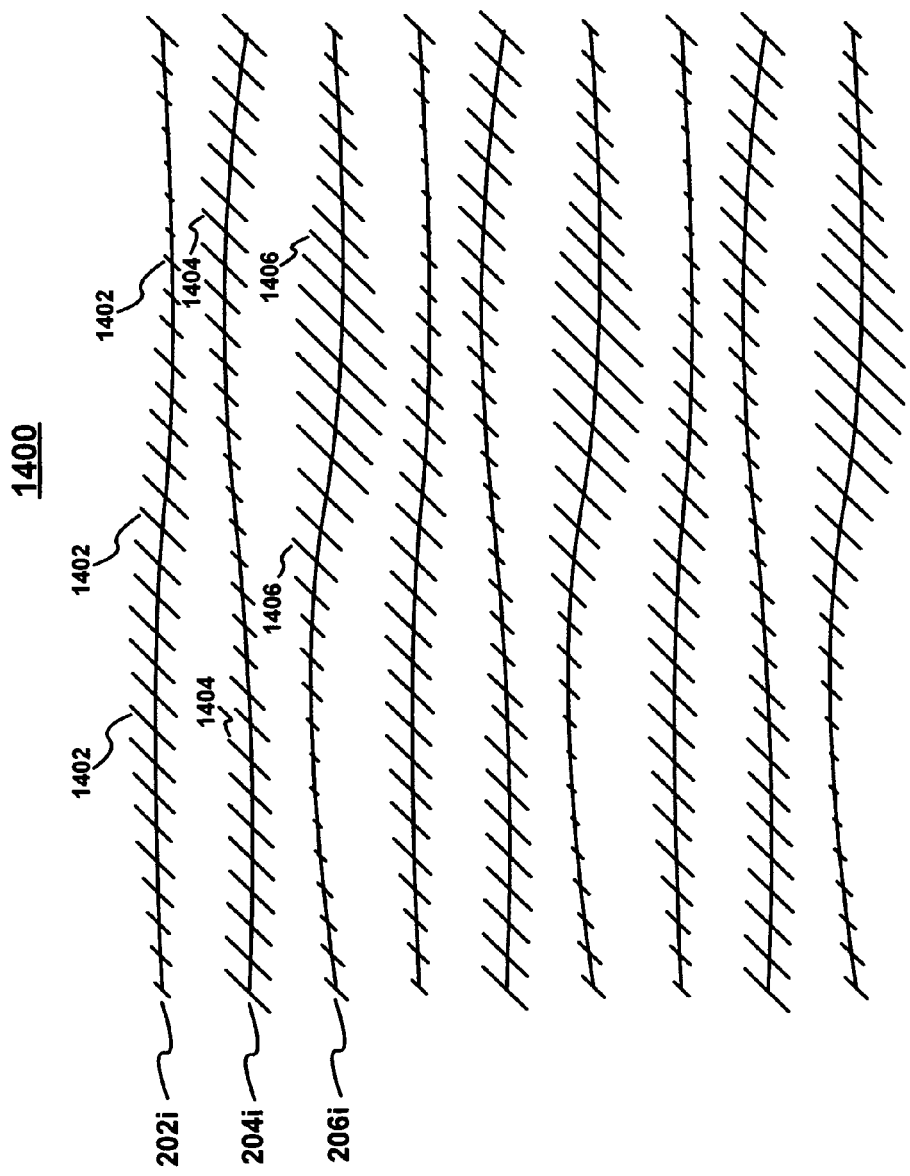
FIG. 14 illustrates another exemplary "fishbone" capacitive sensor pattern in accordance with embodiments of the invention.

FIG. 14 is a plan view of an exemplary "fishbone" capacitive sensor pattern 1400 in accordance with embodiments of the invention. Specifically, sensor pattern 1400 includes three repeated patterns of sensing elements 202*i*, 204*i*, and 206*i* having three phases which can be utilized as part of a two-dimensional capacitive sensor apparatus (e.g., 100), such as but not limited to, a touch screen and/or a touchpad. When electrically coupled, sensor pattern 1400 can provide two-dimensional positioning information that has substantially parallel traces (or sensing elements) with no crossovers. The sensor pattern 1400 can be utilized in any manner similar to that described herein with reference to FIGS. 2 and 4. Furthermore, sensor pattern 1400 can be utilized in any manner similar to that described herein, but is not limited to such.

Specifically, sensing element 202*i* includes a plurality of extensions 1402 that are substantially parallel to each other and are substantially non-parallel to a first axis of sensing element 202*i*. It is noted that the plurality of extensions 1402 cumulatively defines an envelope the shape of a first waveform. The sensing element 204*i* includes a plurality of extensions 1404 that are substantially parallel to each other and are substantially non-parallel to the first axis of sensing element 204*i*. It is understood that the plurality of extensions 1404 cumulatively defines an envelope the shape of a second waveform. The sensing element 206*i* includes a plurality of extensions 1406 that are substantially parallel to each other and are substantially non-parallel to the first axis of sensing element 206*i*. It is appreciated that the plurality of extensions 1406 cumulatively defines an envelope the shape of a third waveform.

The repeated sets of sensing elements 202*i*, 204*i*, and 206*i* can be used for determining a first location of an object (e.g., a user's finger, a probe, a stylus, and the like) in relation to sensor pattern 1400 along the first axis of a two-dimensional space. Furthermore, the repeated sets of sensing elements 202*i*, 204*i*, and 206*i* can be used for determining first and second locations of an object in relation to sensor pattern 1400 along the first axis and a second axis of the two-dimensional space, wherein the second axis is substantially non-parallel (or substantially perpendicular) to the first axis.

Within FIG. 14, sensor pattern 1400 can operate in any manner similar to sensor pattern 500 of FIG. 5. Furthermore, it is appreciated that the sum of the widths of any three adjacent traces (or sensing elements) of sensor pattern 1400 can be implemented as a substantial constant width. The sensor pattern 1400 can be implemented with a greater or fewer number of sensing elements than shown within the present embodiment. Sensor pattern 1400 and its sensing elements can be implemented in any manner similar to that described herein, but is not limited to such.

Within FIGS. 13 and 14, it is noted that second axis (e.g., Y axis) sensing elements having substantially constant width can be implemented as part of sensor patterns 1300 and/or 1400. For example, second axis sensing elements can be incorporated with sensor patterns 1300 and/or 1400 in any manner similar to that described herein with reference to FIGS. 6 and 7, but is not limited to such.

Figure 15:
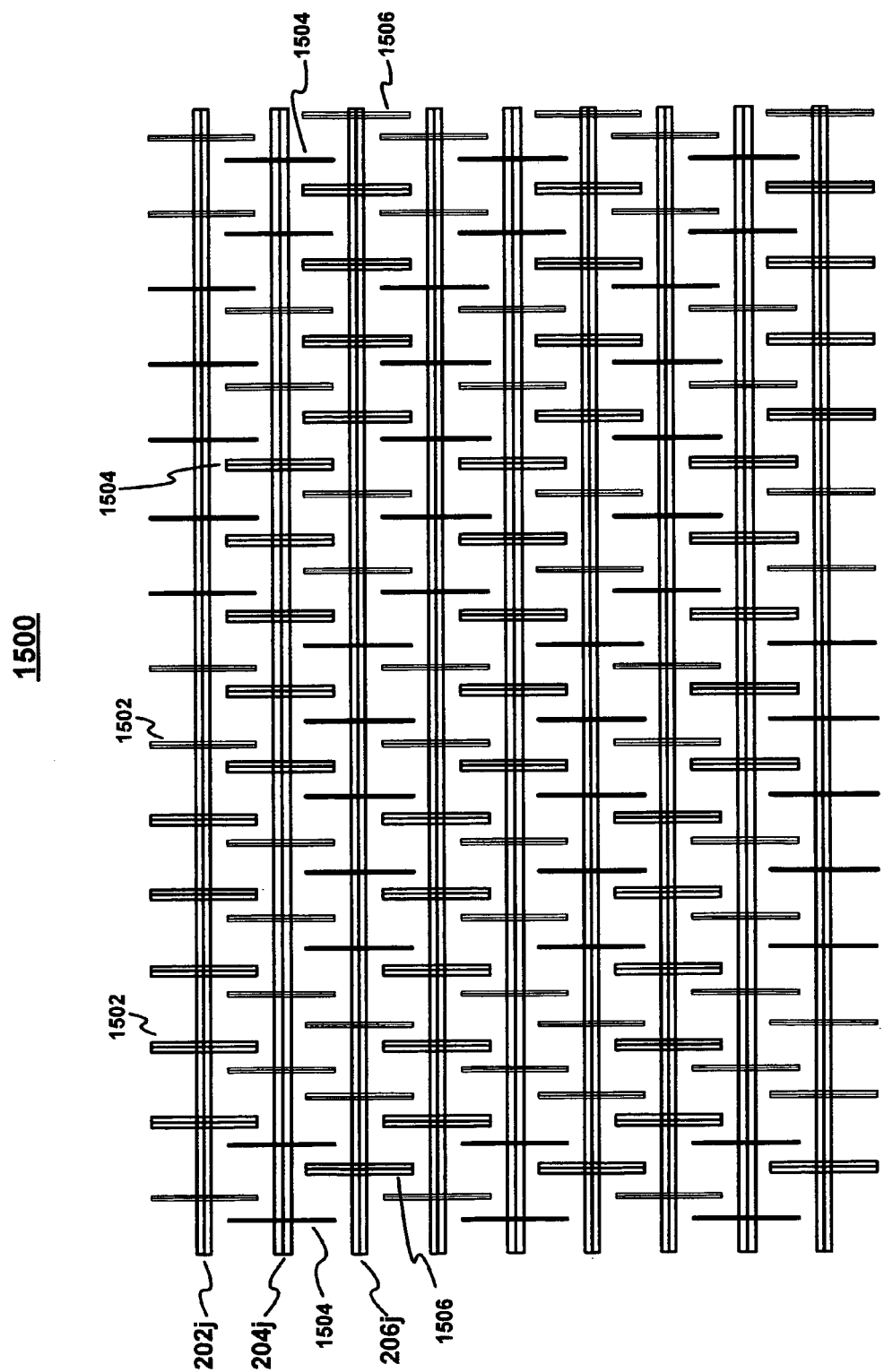
FIG. 15 illustrates yet another exemplary "fishbone" capacitive sensor pattern in accordance with embodiments of the invention.

FIG. 15 is a plan view of an exemplary "fishbone" capacitive sensor pattern 1500 in accordance with embodiments of the invention. Specifically, sensor pattern 1500 includes three repeated patterns of sensing elements 202*j*, 204*j*, and 206*j* having three phases which can be utilized as part of a two-dimensional capacitive sensor apparatus (e.g., 100), such as but not limited to, a touch screen and/or a touchpad. When electrically coupled, sensor pattern 1500 can provide two-dimensional positioning information that has substantially parallel traces (or sensing elements) with no crossovers. The sensor pattern 1500 can be utilized in any manner similar to that described herein with reference to FIGS. 2 and 4, but is not limited to such. Moreover, sensor pattern 1500 can be utilized in any manner similar to that described herein, but is not limited to such.

Specifically, sensing element 202*j* includes a plurality of extensions 1502 that are substantially parallel to each other and are substantially perpendicular to a first axis of sensing element 202*j*. It is noted that the plurality of extensions 1502 can each be implemented with a different width that slightly varies with its neighboring extension. As such, a first waveform is defined by the varying widths of the plurality of extensions 1502. The sensing element 204*j* includes a plurality of extensions 1504 that are substantially parallel to each other and are substantially perpendicular to the first axis of sensing element 204*j*. It is understood that the plurality of extensions 1504 can each be implemented with a different width that slightly varies with its neighboring extension. Therefore, a second waveform is defined by the varying widths of the plurality of extensions 1504. The sensing element 206*j* includes a plurality of extensions 1506 that are substantially parallel to each other and are substantially perpendicular to the first axis of sensing element 206*j*. It is appreciated that the plurality of extensions 1506 can each be implemented with a different width that slightly varies with its neighboring extension. As such, a third waveform is defined by the varying widths of the plurality of extensions 1506.

Within FIG. 15, the plurality of extensions 1502 of sensing element 202*j* are interdigitated with the plurality of extensions 1504 of sensing element 204*j*. Moreover, the plurality of extensions 1506 of sensing element 206*j* are interdigitated with the plurality of extensions 1504 of sensing element 204*j*.

The repeated sets of sensing elements 202*j*, 204*j*, and 206*j* can be used for determining a first location of an object (e.g., a user's finger, a probe, a stylus, and the like) in relation to sensor pattern 1500 along the first axis of a two-dimensional space. Furthermore, the repeated sets of sensing elements 202*j*, 204*j*, and 206*j* can be used for determining first and second locations of an object in relation to sensor pattern 1500 along the first axis and a second axis of the two-dimensional space, wherein the second axis is substantially non-parallel (or substantially perpendicular) to the first axis.

Within FIG. 15, sensor pattern 1500 can operate in any manner similar to sensor pattern 500 of FIG. 5. Additionally, the sensor pattern 1500 can be implemented with a greater or fewer number of sensing elements than shown within the present embodiment. Sensor pattern 1500 and its sensing elements can be implemented in any manner similar to that described herein, but is not limited to such.

Figure 16:
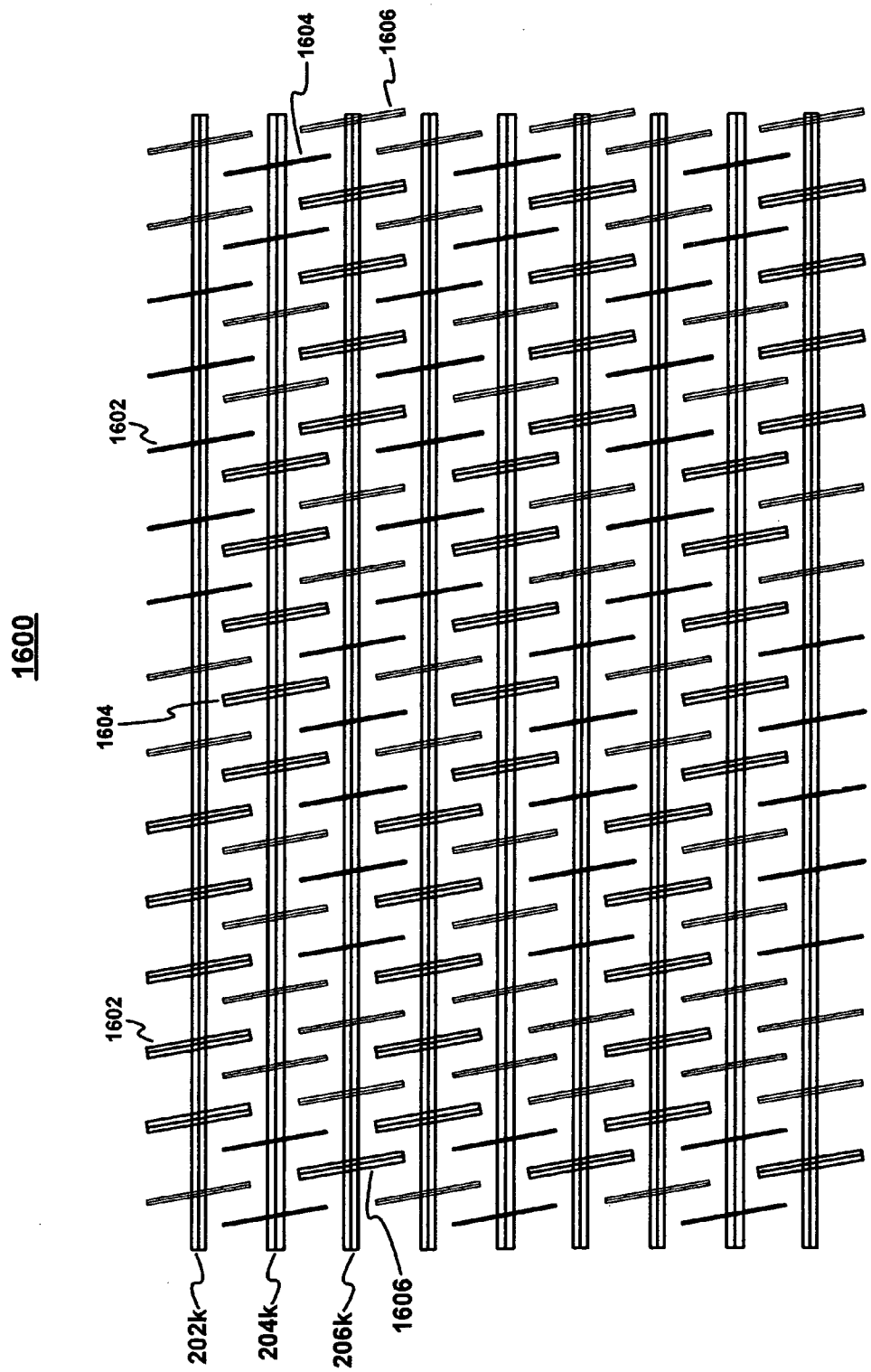
FIG. 16 illustrates still another exemplary "fishbone" capacitive sensor pattern in accordance with embodiments of the invention.

FIG. 16 is a plan view of an exemplary "fishbone" capacitive sensor pattern 1600 in accordance with embodiments of the invention. Specifically, sensor pattern 1600 includes four repeated patterns of sensing elements 202k, 204k, and 206k having three phases which can be utilized as part of a two-dimensional capacitive sensor apparatus (e.g., 100), such as but not limited to, a touch screen and/or a touchpad. When electrically coupled, sensor pattern 1600 can provide two-dimensional positioning information that has substantially parallel traces (or sensing elements) with no crossovers. The sensor pattern 1600 can be utilized in any manner similar to that described herein with reference to FIGS. 2 and 4, but is not limited to such. Furthermore, sensor pattern 1600 can be utilized in any manner similar to that described herein, but is not limited to such.

Specifically, sensing element 202k includes a plurality of extensions 1602 that are substantially parallel to each other and are substantially non-parallel to a first axis of sensing element 202k. It is noted that the plurality of extensions 1602 can each be implemented with a different width that slightly varies with its neighboring extension. As such, a first waveform is defined by the varying widths of the plurality of extensions 1602. The sensing element 204k includes a plurality of extensions 1604 that are substantially parallel to each other and are substantially non-parallel to the first axis of sensing element 204k. It is understood that the plurality of extensions 1604 can each be implemented with a different width that slightly varies with its neighboring extension. Therefore, a second waveform is defined by the varying widths of the plurality of extensions 1604. The sensing element 206k includes a plurality of extensions 1606 that are substantially parallel to each other and are substantially non-parallel to the first axis of sensing element 206k. It is appreciated that the plurality of extensions 1606 can each be implemented with a different width that slightly varies with its neighboring extension. As such, a third waveform is defined by the varying widths of the plurality of extensions 1606.

Within FIG. 16, the plurality of extensions 1602 of sensing element 202k are interdigitated with the plurality of extensions 1604 of sensing element 204k. Furthermore, the plurality of extensions 1606 of sensing element 206k are interdigitated with the plurality of extensions 1604 of sensing element 204k.

The repeated sets of sensing elements 202k, 204k, and 206k can be used for determining a first location of an object (e.g., a user's finger, a probe, a stylus, and the like) in relation to sensor pattern 1600 along the first axis of a two-dimensional space. Additionally, the repeated sets of sensing elements 202k, 204k, and 206k can be used for determining first and second locations of an object in relation to sensor pattern 1600 along the first axis and a second axis of the two-dimensional space, wherein the second axis is substantially non-parallel (or substantially perpendicular) to the first axis.

Within FIG. 16, sensor pattern 1600 can operate in any manner similar to sensor pattern 500 of FIG. 5. Furthermore, the sensor pattern 1600 can be implemented with a greater or fewer number of sensing elements than shown within the present embodiment. Sensor pattern 1600 and its sensing elements can be implemented in any manner similar to that described herein, but is not limited to such.

Within FIGS. 5-16, it is noted that sensor patterns 500-1600 may each be operated with very few sensor channels. This can offer substantial cost savings if it there is a desire to use a low pin-count package, or build a simplified sensor ASIC (application-specific integrated circuit) for a capacitive sensor device or apparatus.

It is further noted that sensor patterns 200, 300, and 500-1600 can each provide a capacitive sensing geometry that does not induce signal to noise ratio concerns. Additionally, sensor patterns 500-1600 may each be used to detect objects on either side of the substrate onto which it is fabricated. To prevent detection of signals of noise from one side of the substrate, a ground plane or a driven shield conductor may be utilized with each of sensor patterns 500-1600 to shield that side.

Within FIGS. 2, 3, and 5-16, it is pointed out that the sensing elements of sensor patterns 200, 300, and 500-1600 can each include a non-conductive region formed by two or more adjacent sensing elements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A two-dimensional capacitive sensor apparatus comprising:
   a first sensing element having varying width;
   a second sensing element having varying width; and
   a third sensing element having varying width, wherein said first sensing element, second sensing element, and third sensing element are conductive and substantially parallel to a first axis, each of said first sensing element, second sensing element, and third sensing element are located such that said first sensing element, second sensing element, and third sensing element are not required to overlap each other to determine a first location along said first axis of a two-dimensional space, and wherein a sum of the varying widths of said first sensing element, said second sensing element, and said third sensing element is substantially constant.

2. The two-dimensional capacitive sensor apparatus of claim 1, wherein said first sensing element, second sensing element, and third sensing element are used for determining a second location along a second axis substantially perpendicular to said first axis.

3. The two-dimensional capacitive sensor apparatus of claim 1, wherein: said first sensing element comprises a first waveform; said second sensing element comprises a second waveform; and said third sensing element comprises a third waveform.

4. The two-dimensional capacitive sensor apparatus of claim 3, wherein: said first waveform comprises a first phase; said second waveform comprises a second phase; and said third waveform comprises a third phase.

5. The two-dimensional capacitive sensor apparatus of claim 1, wherein: said first sensing element comprises a sine (.theta.) waveform; said second sensing element comprises a waveform offset from said sine (.theta.) waveform; and said third sensing element comprises a waveform offset from said sine (.theta.) waveform.

6. The two-dimensional capacitive sensor apparatus of claim 1, wherein said first location along said first axis is determined using a first sensing element signal, a second sensing element signal, and a third sensing element signal.

7. The two-dimensional capacitive sensor apparatus of claim 1, wherein said first location along said first axis is determined using a trigonometric function.

8. The two-dimensional capacitive sensor apparatus of claim 1, further comprising:
a fourth sensing element utilized to determine a second location along a second axis that is substantially perpendicular to said first axis, said fourth sensing element being substantially parallel to said first axis.

9. The two-dimensional capacitive sensor apparatus of claim 1, further comprising:
a fourth sensing element having varying width;
a fifth sensing element having varying width; and
a sixth sensing element having varying width, wherein said fourth, fifth, and sixth sensing elements are substantially parallel to said first sensing element, and are located such that each does not require overlap of said first, second, third, fourth, fifth, and sixth sensing elements to determine said first location along said first axis.

10. The two-dimensional capacitive sensor apparatus of claim 9, wherein said first, second, third, fourth, fifth, and sixth sensing elements are used to determine a second position along a second axis not parallel to said first axis.

11. The two-dimensional capacitive sensor apparatus of claim 9, wherein: said first, second, and third sensing elements each comprises a first sinusoidal waveform; and said fourth, fifth, and sixth sensing elements each comprises a second sinusoidal waveform.

12. The two-dimensional capacitive sensor apparatus of claim 11, wherein first sinusoidal waveform has a lower frequency than said second sinusoidal waveform.

13. The two-dimensional capacitive sensor apparatus of claim 1, wherein said first, second, and third sensing elements are utilized as part of a capacitive touch screen device.

14. The two-dimensional capacitive sensor apparatus of claim 1, wherein said first, second, and third sensing elements are utilized as part of a capacitive touch pad device.

15. A two-dimensional capacitive sensor apparatus comprising:
a first sensing element having varying width and is conductive;
a second sensing element having varying width and is conductive and
a third sensing element having varying width and is conductive, wherein said first sensing element, second sensing element, and third sensing element are substantially parallel to a first axis and are located such that said first sensing element, second sensing element, and third sensing element are not required to overlap each other to determine a first location along said first axis of a two-dimensional space, wherein a sum of output signals of said first sensing element, said second sensing element, and said third sensing element is substantially constant at different locations along said first sensing element, second sensing element, and third sensing element.

16. The two-dimensional capacitive sensor apparatus of claim 15, wherein said first sensing element, second sensing element, and third sensing element are used for determining a second location along a second axis, substantially perpendicular to said first axis.

17. The two-dimensional capacitive sensor apparatus of claim 15, wherein: said first sensing element comprises a first waveform; said second sensing element comprises a second waveform; and said third sensing element comprises a third waveform.

18. The two-dimensional capacitive sensor apparatus of claim 15, wherein: said first sensing element comprises a first phase; said second sensing element comprises a second phase; and said third sensing element comprises a third phase.

19. The two-dimensional capacitive sensor apparatus of claim 15, wherein said first location along said first axis is determined using a first sensing element signal, a second sensing element signal, a third sensing element signal, and a trigonometric function.

20. The two-dimensional capacitive sensor apparatus of claim 15, further comprising:
a fourth sensing element utilized to determine a second location along a second axis that is non-parallel to said first axis, said fourth sensing element substantially parallel to said third sensing element.

21. A portable electronic device comprising:
a two-dimensional capacitive sensor; and
a processor coupled with said two-dimensional capacitive sensor; wherein said two-dimensional capacitive sensor comprises:
a first sensing element having varying width;
a second sensing element having varying width; and
a third sensing element having varying width, wherein said first sensing element, second sensing element, and third sensing element are each conductive and substantially parallel to a first axis, each of said first sensing element, second sensing element, and third sensing element is located such that said first sensing element, second sensing element, and third sensing element are not required to overlap each other to determine a first location along said first axis of a two-dimensional space, wherein a sum of the varying widths of said first sensing element, said second sensing element, and said third sensing element is substantially constant.

22. The portable electronic device of claim 21, wherein said first sensing element, second sensing element, and third sensing element are used for determining a second location along a second axis not parallel to said first axis.

23. The portable electronic device of claim 21, wherein: said first sensing element comprises a first waveform; said second sensing element comprises a second waveform; and said third sensing element comprises a third waveform.

24. The portable electronic device of claim 23, wherein: said first sensing element comprises a first phase; said second sensing element comprises a second phase; and said third sensing element comprises a third phase.

25. The portable electronic device of claim 21, wherein: said first sensing element comprises a sine (.theta.) waveform; said second sensing element comprises a sine (.theta.) waveform shifted from said sine (.theta.) waveform of said first sensing element by 2.pi./3 radians; and said third sensing element comprises a sine (.theta.) waveform shifted from said sine (.theta.) waveform of said first sensing element by 2.pi./3 radians.

26. The portable electronic device of claim 21, wherein said first location along said first axis is determined using a first sensing element signal, a second sensing element signal, and a third sensing element signal.

27. The portable electronic device of claim 21, wherein said first location along said first axis is determined using a trigonometric function.

28. The portable electronic device of claim 21, further comprising:
   a fourth sensing element utilized to determine a second location along a second axis that is substantially perpendicular to said first axis, said fourth sensing element being substantially parallel to said first axis.

29. A capacitive sensor device comprising:
   a substrate;
   a first conductive trace having varying width and disposed above said substrate;
   a second conductive trace having varying width and disposed above said substrate; and
   a third conductive trace having varying width and disposed above said substrate, wherein said first, second, and third conductive traces are substantially parallel to a first axis and are located such that each does not require overlap of said first, second, and third conductive traces to determine a first axis location, wherein a sum of output signals of said first, said second, and said third conductive traces is substantially constant at different locations along said first, second, and third conductive traces.

30. The capacitive sensor device of claim 29, wherein: said first conductive trace comprises a first waveform; said second conductive trace comprises a second waveform; and said third conductive trace comprises a third waveform.

31. The capacitive sensor device of claim 30, wherein: said first conductive trace comprises a first phase; said second conductive trace comprises a second phase; and said third conductive trace comprises a third phase.

32. The capacitive sensor device of claim 31, wherein said first, second, and third conductive traces each comprises a sinusoidal waveform.

33. The capacitive sensor device of claim 29, wherein said first, second, and third conductive traces have a cumulative width that is substantially constant.

34. The capacitive sensor device of claim 29, wherein said first axis location is determined using a first conductive trace signal, a second conductive trace signal, and a third conductive trace signal.

35. The capacitive sensor device of claim 29, further comprising:
   a fourth conductive trace utilized to determine a second axis location that is substantially parallel to said first axis location, said fourth conductive trace is not parallel to said first axis.

36. The capacitive sensor device of claim 29, wherein said first, second, and third conductive traces are utilized to determine a second axis location that is not parallel to said first axis.

37. A two-dimensional capacitive sensor apparatus comprising:
   a first sensing element having varying width;
   a second sensing element having varying width;
   a third sensing element having varying width; and
   a fourth sensing element having varying width, wherein said first sensing element, said second sensing element, said third sensing element and said fourth sensing element are conductive and substantially parallel to a first axis, each of said first sensing element, said second sensing element, said third sensing element and said fourth sensing element are located such that said first sensing element, said second sensing element, said third sensing element and said fourth sensing element are not required to overlap each other to determine a first location along said first axis of a two-dimensional space, wherein said first sensing element comprises a first waveform shape; said second sensing element comprises a second waveform shape; said third sensing element comprises a third waveform shape and said fourth element comprises a fourth waveform shape, and wherein a sum of the varying widths of said first sensing element, said second sensing element, said third sensing element and said fourth sensing element is substantially constant, wherein said first sensing element, said second sensing element, said third sensing element and said fourth sensing element vary periodically with a period greater than the length of said first sensing element, said second sensing element, said third sensing element and said fourth sensing element, and wherein each of said first sensing element, said second sensing element, said third sensing element and said fourth sensing element has a different phase so as to produce a unique output signal along its length.

38. The two-dimensional capacitive sensor apparatus of claim 37, wherein said first sensing element, said second sensing element, said third sensing element and said fourth sensing element are used for determining a second location along a second axis substantially perpendicular to said first axis.

39. The two-dimensional capacitive sensor apparatus of claim 37, wherein said first waveform shape comprises a first phase; said second waveform shape comprises a second phase; said third waveform shape comprises a third phase and said fourth waveform comprises a fourth phase.

40. The two-dimensional capacitive sensor apparatus of claim 37, wherein: said first sensing element comprises a sine (.theta.) waveform shape; said second sensing element comprises a waveform shape offset from said sine (.theta.) waveform shape; said third sensing element comprises a waveform shape offset from said sine (.theta.) waveform shape; and said fourth sensing element comprises a waveform shape offset from said sine (.theta.) waveform shape.

41. The two-dimensional capacitive sensor apparatus of claim 37, wherein said first location along said first axis is determined using a first sensing element signal, a second sensing element signal, a third sensing element signal and a fourth sensing element signal.

42. The two-dimensional capacitive sensor apparatus of claim 37, wherein said first location along said first axis is determined using a trigonometric function.

43. A two-dimensional capacitive sensor apparatus comprising:
   a first sensing element having varying width;
   a second sensing element having varying width;
   a third sensing element having varying width;
   a fourth sensing element having varying width; and
   a fifth sensing element having varying width, wherein said first sensing element, said second sensing element, said third sensing element, said fourth sensing element and said fifth sensing element are conductive and substantially parallel to a first axis, each of said first sensing element, said second sensing element, said third sensing element, said fourth sensing element and said fifth sensing element are located such that said first sensing element, said second sensing element, said third sensing element, said fourth sensing element and said fifth sensing element are not required to overlap each other to determine a first location along said first axis of a two-dimensional space, and wherein a sum of the varying widths of said first sensing element, said second sensing element, said third sensing element, said fourth sensing element and said fifth sensing element is substantially constant.

44. The two-dimensional capacitive sensor apparatus of claim 43, wherein said first sensing element, said second sensing element, said third sensing element, said fourth sensing element and said fifth sensing element are used for determining a second location along a second axis substantially perpendicular to said first axis.

45. The two-dimensional capacitive sensor apparatus of claim 43, wherein said first sensing element comprises a first waveform; said second sensing element comprises a second waveform; said third sensing element comprises a third waveform, said fourth element comprises a fourth waveform, and said fifth element comprises a fifth waveform.

46. The two-dimensional capacitive sensor apparatus of claim 45, wherein said first waveform comprises a first phase; said second waveform comprises a second phase; said third waveform comprises a third phase, said fourth waveform comprises a fourth phase and said fifth waveform comprises a fifth phase.

47. The two-dimensional capacitive sensor apparatus of claim 43, wherein: said first sensing element comprises a sine (.theta.) waveform; said second sensing element comprises a waveform offset from said sine (.theta.) waveform; said third sensing element comprises a waveform offset from said sine (.theta.) waveform; said fourth sensing element comprises a waveform offset from said sine (.theta.) waveform and said fifth sensing element comprises a waveform offset from said sine (.theta.) waveform.

48. The two-dimensional capacitive sensor apparatus of claim 43, wherein said first location along said first axis is determined using a first sensing element signal, a second sensing element signal, a third sensing element signal, a fourth sensing element signal and a fifth sensing element signal.

49. The two-dimensional capacitive sensor apparatus of claim 43, wherein said first location along said first axis is determined using a trigonometric function.

50. A two-dimensional capacitive sensor apparatus comprising:
   a first sensing element having varying width;
   a second sensing element having varying width;
   a third sensing element having varying width;
   a fourth sensing element having varying width;
   a fifth sensing element having varying width; and
   a sixth sensing element having varying width, wherein said first sensing element, said second sensing element, said third sensing element, said fourth sensing element, said fifth sensing element and said sixth sensing element are conductive and substantially parallel to a first axis, each of said first sensing element, said second sensing element, said third sensing element, said fourth sensing element, said fifth sensing element and said sixth sensing element are located such that said first sensing element, said second sensing element, said third sensing element, said fourth sensing element, said fifth sensing element and said sixth sensing element are not required to overlap each other to determine a first location along said first axis of a two-dimensional space, wherein said first sensing element comprises a first waveform shape; said second sensing element comprises a second waveform shape; said third sensing element comprises a third waveform shape, said fourth element comprises a fourth waveform shape, said fifth element comprises a fifth waveform shape and said sixth element comprises a sixth waveform shape, and wherein a sum of the varying widths of said first sensing element, said second sensing element, said third sensing element, said fourth sensing element, said fifth sensing element and said sixth sensing element is substantially constant, wherein said first sensing element, said second sensing element, said third sensing element, said fourth sensing element, said fifth sensing element, and said sixth sensing element vary periodically with a period greater than the length of said first sensing element, said second sensing element, said third sensing element, said fourth sensing element, said fifth sensing element, and said sixth sensing element and wherein each of said first sensing element, said second sensing element, said third sensing element, said fourth sensing element, said fifth sensing element, and said sixth sensing element has a different phase so as to produce a unique output signal along its length.

51. The two-dimensional capacitive sensor apparatus of claim 50, wherein said first sensing element, said second sensing element, said third sensing element, said fourth sensing element, said fifth sensing element and said sixth sensing element are used for determining a second location along a second axis substantially perpendicular to said first axis.

52. The two-dimensional capacitive sensor apparatus of claim 50, wherein said first waveform shape comprises a first phase; said second waveform shape comprises a second phase; said third waveform shape comprises a third phase, said fourth waveform shape comprises a fourth phase, said fifth waveform shape comprises a fifth phase and said sixth waveform shape comprises a sixth phase.

53. The two-dimensional capacitive sensor apparatus of claim 50, wherein: said first sensing element comprises a sine (.theta.) waveform shape; said second sensing element comprises a waveform shape offset from said sine (.theta.) waveform shape; said third sensing element comprises a waveform shape offset from said sine (.theta.) waveform shape; said fourth sensing element comprises a waveform shape offset from said sine (.theta.) waveform shape, said fifth sensing element comprises a waveform shape offset from said sine (.theta.) waveform shape and said sixth sensing element comprises a waveform shape offset from said sine (.theta.) waveform shape.

54. The two-dimensional capacitive sensor apparatus of claim 50, wherein said first location along said first axis is determined using a first sensing element signal, a second sensing element signal, a third sensing element signal, a fourth sensing element signal a fifth sensing element signal and a sixth sensing element signal.

55. The two-dimensional capacitive sensor apparatus of claim 50, wherein said first location along said first axis is determined using a trigonometric function.

56. A two-dimensional capacitive sensor apparatus comprising:
   n sensing elements, wherein each of said n sensing elements has a varying width and wherein n is an integer is larger than 2, wherein said n sensing elements are conductive and substantially parallel to a first axis, each of said n sensing elements are located such that said n sensing elements are not required to overlap each other to determine a first location along said first axis of a two-dimensional space, wherein said n sensing elements comprise n waveform shapes and wherein a sum of the varying widths of said n sensing elements is substantially constant, wherein said n sensing elements vary periodically with a period greater than the length of said n sensing elements, and wherein each of said n sensing elements has a different phase so as to produce a unique output signal along its length.

57. The two-dimensional capacitive sensor apparatus of claim 56, wherein said n sensing elements are used for determining a second location along a second axis substantially perpendicular to said first axis.

58. The two-dimensional capacitive sensor apparatus of claim 56, wherein said n waveform shapes comprise n phases.

59. The two-dimensional capacitive sensor apparatus of claim 56, wherein: said n sensing elements comprises a sine (.theta.) waveform shape and n-1 waveform shapes offset from said sine (.theta.) waveform shape.

60. The two-dimensional capacitive sensor apparatus of claim 56, wherein said first location along said first axis is determined using n sensing element signals.

61. The two-dimensional capacitive sensor apparatus of claim 56, wherein said first location along said first axis is determined using a trigonometric function.

* * * * *